US012673531B2

(12) United States Patent
Migneco et al.

(10) Patent No.: US 12,673,531 B2
(45) Date of Patent: Jul. 7, 2026

(54) HOLISTIC SEAT CLIMATE SYSTEM

(71) Applicant: LEAR CORPORATION, Southfield, MI (US)

(72) Inventors: Francesco Migneco, Southfield, MI (US); Hussein Zaarour, Dearborn, MI (US); Milan Tueskes, Genoa (IT); Vyachislav Ivanov, West Bloomfield, MI (US); Steven Ziolkowski, Farmington Hills, MI (US); Daniel Josefsson, Falköping (SE); Brenton L. Riegel, Southfield, MI (US); William Burmeister, Waterford, MI (US); Sumanth Muthyala, Ann Arbor, MI (US); Brad Duncan, Southfield, MI (US)

(73) Assignee: LEAR CORPORATION, Southfield, MI (US)

( * ) Notice: Subject to any disclaimer, the term of this patent is extended or adjusted under 35 U.S.C. 154(b) by 22 days.

(21) Appl. No.: 18/407,619

(22) Filed: Jan. 9, 2024

(65) Prior Publication Data

US 2025/0222741 A1 Jul. 10, 2025

(51) Int. Cl.
B60H 1/00 (2006.01)

(52) U.S. Cl.
CPC ..... B60H 1/00742 (2013.01); B60H 1/00285 (2013.01); B60H 1/00878 (2013.01); B60H 2001/00949 (2013.01)

(58) Field of Classification Search
CPC ............ B60H 1/00742; B60H 1/00285; B60H 1/00878; B60H 2001/00949
See application file for complete search history.

(56) References Cited

U.S. PATENT DOCUMENTS

| 4,920,759 | A | * | 5/1990 | Tanaka | ................. | B60H 1/2227 |
| | | | | | | 165/41 |
| 11,577,578 | B2 | * | 2/2023 | Salter | .................. | B60N 2/5685 |
| 2001/0039806 | A1 | * | 11/2001 | Kawai | ................ | B60H 1/00742 |
| | | | | | | 374/E1.005 |

(Continued)

OTHER PUBLICATIONS

International Search Report and Written Opinion for PCT/US2025/010673 mailed Feb. 28, 2025.

*Primary Examiner* — Anne Marie Antonucci
*Assistant Examiner* — Luis G Del Valle
(74) *Attorney, Agent, or Firm* — Carlson, Gaskey & Olds, P.C.

(57) ABSTRACT

A system and method include providing an HVAC to heat or cool a volumetric space, and identifying one or more seats within the volumetric space, each of the one or more seats comprising one or more thermal elements, the one or more thermal elements controlling a temperature of the one or more seats. The system and method further include: determining a thermal comfort setting for each of the one or more seats; determining a current temperature of the volumetric space as measured by one or more sensors; and determining, based on the thermal comfort settings, the current temperature of the volumetric space, a temperature setting for the HVAC, and a temperature setting for the one or more seats, the temperature setting for the HVAC and the temperature setting for the one or more seats achieving the thermal comfort setting for each of the one or more seats.

20 Claims, 15 Drawing Sheets

(56)                     References Cited

U.S. PATENT DOCUMENTS

| | | | |
|---|---|---|---|
| 2005/0040682 A1 | 2/2005 | Ulbrich | |
| 2007/0193279 A1 | 8/2007 | Yoneno et al. | |
| 2016/0009206 A1* | 1/2016 | Perraut | B60N 2/565 |
| | | | 297/180.12 |
| 2016/0046171 A1* | 2/2016 | Xia | B60H 1/00821 |
| | | | 165/203 |
| 2016/0325656 A1 | 11/2016 | Ziolek et al. | |
| 2017/0334263 A1* | 11/2017 | Schumacher | B60H 1/00742 |
| 2018/0251008 A1 | 9/2018 | Androulakis et al. | |
| 2019/0084372 A1* | 3/2019 | Gallagher | A61B 5/6893 |
| 2020/0049462 A1* | 2/2020 | Jones | E04H 1/1205 |
| 2020/0158525 A1 | 5/2020 | Rakah et al. | |
| 2023/0191871 A1* | 6/2023 | Feltham | B60H 1/00499 |
| | | | 701/36 |
| 2025/0164140 A1* | 5/2025 | Chowdhury | F24F 11/64 |

* cited by examiner

HOLISTIC SEAT CLIMATE SYSTEM

BACKGROUND

Vehicles include various systems that each have different power requirements. It can be challenging to balance available power amongst the various systems to provide a desired passenger comfort level while also maintaining other vehicle functions.

BRIEF DESCRIPTION OF THE DRAWINGS

FIG. 2A-1 is a first portion of a flow diagram of one example method of controlling a holistic seat climate system. FIG. 2A-2 is a continuation of the flow diagram of FIG. 2A-1.

DETAILED DESCRIPTION

Figure 1:
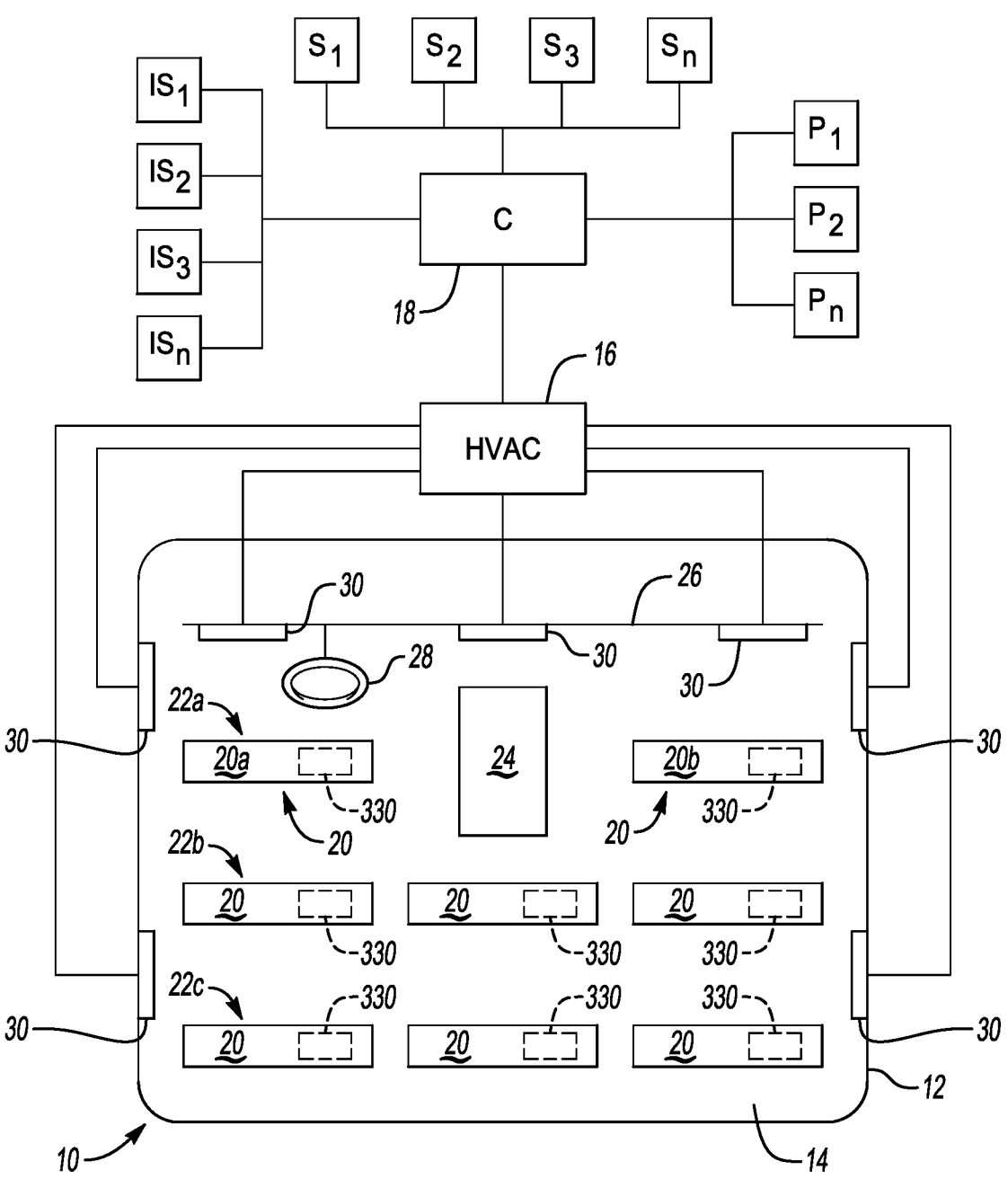
FIG. 1 is a schematic representation of a vehicle incorporating a holistic seat climate system that utilizes a plurality of external inputs and internal inputs to provide a desired seat climate while also maintaining other desired vehicle functions.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates to a holistic seat climate system that utilizes a plurality of external inputs and internal inputs to provide a desired seat climate while also maintaining other desired vehicle functions.

FIG. 1 shows a vehicle 10 including a passenger cabin 12 enclosing an internal volumetric space 14 that is to be heated and cooled via a heating, ventilation, and air conditioning (HVAC) system 16. The vehicle 10 can be a vehicle powered by an internal combustion engine or can be an electrified vehicle that includes a plurality powertrain components P1, P2 . . . . Pn, such as a traction battery pack assembly, an electric motor or machine, power electronics, etc. As known, the traction battery pack assembly powers an electric machine, which can convert electrical power to mechanical power to drive wheels of the vehicle 10. The traction battery pack assembly can be a relatively high-voltage battery. The electrified vehicle 10 can be: an all-electric vehicle; a hybrid electric vehicle, which selectively drives wheels using torque provided by an internal combustion engine instead of, or in addition to, an electric machine; or generally any other type of vehicle having a traction battery pack.

The vehicle 10 includes a plurality of external sensors (S1, S2, S3 . . . . Sn) that are used to monitor, measure, and/or communicate data related to an environment that is external to the vehicle 10. The vehicle 10 includes a plurality of internal sensors (IS1, IS2, IS3 . . . . ISn) that are used to monitor, measure, and/or communicate data related to an environment that is internal to the vehicle 10. The external sensors (S1, S2, S3 . . . . Sn) and the internal sensors (IS1, IS2, IS3 . . . . ISn) communicate data to one or more controllers 18 that comprise any device for executing software instructions such as one or more processing units with non-transitory memory and input/output devices.

For example, the one or more controllers 18 can include one or more processors, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The one or more controllers 18 may be a hardware device for executing software, particularly software stored in memory. The one or more controllers 18 can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a smart device (phone, tablet, etc.), a touch screen, a key pad, a keyboard, mouse, scanner, microphone, camera, proximity device, etc. Further, the Input/Output devices may also include output devices, for example but not limited to, a smart device (phone, tablet, etc.), a printer, a display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The one or more controllers 18 can be configured to execute software stored within the memory, to communicate data to and from the memory, and to generally control operations of the computing device pursuant to the software. Software in memory, in whole or in part, is read by the processor, perhaps buffered within the processor, and then executed.

The one or more controllers 18 are configured to control the various powertrain components (P1, P2 . . . . Pn) and HVAC 16 as needed to perform desired functions. Control decisions are based on data stored within memory and/or received from the external sensors (S1, S2, S3 . . . . Sn) and the internal sensors (IS1, IS2, IS3 . . . . ISn). For example, control decisions can include providing desired internal environment conditions for the vehicle, supplying a required amount of power to the various powertrain components (P1, P2 . . . . Pn) to maintain a desired vehicle operating capability, balancing power requirements between the HVAC 16 and the powertrain components (P1, P2 . . . . Pn), etc.

The vehicle includes a plurality of seats 20, e.g. a seat back pivotally coupled to a seat cushion bottom, which are positioned in rows 22a, 22b, 22c as shown in FIG. 1. While the vehicle 10 is shown to have a first row 22a, a second row 22b, and a third row 22c, it should be understood that the vehicle could have only one row, two rows, or more than three rows of seats. The second row 22a, third row 22c, and any additional rows can include only one seat 20 or can include multiple seats 20. In one example, the front row 22a includes at least a driver seat 20a and a passenger seat 20b that are separated by a center console 24. A dashboard 26 supports a steering wheel 28 that is positioned in front of the driver seat 20a. The HVAC 16 includes a plurality of thermal ducts/vents 30 that are positioned along the dashboard 26 and throughout various locations within the vehicle 10.

Figures 1, 2A:
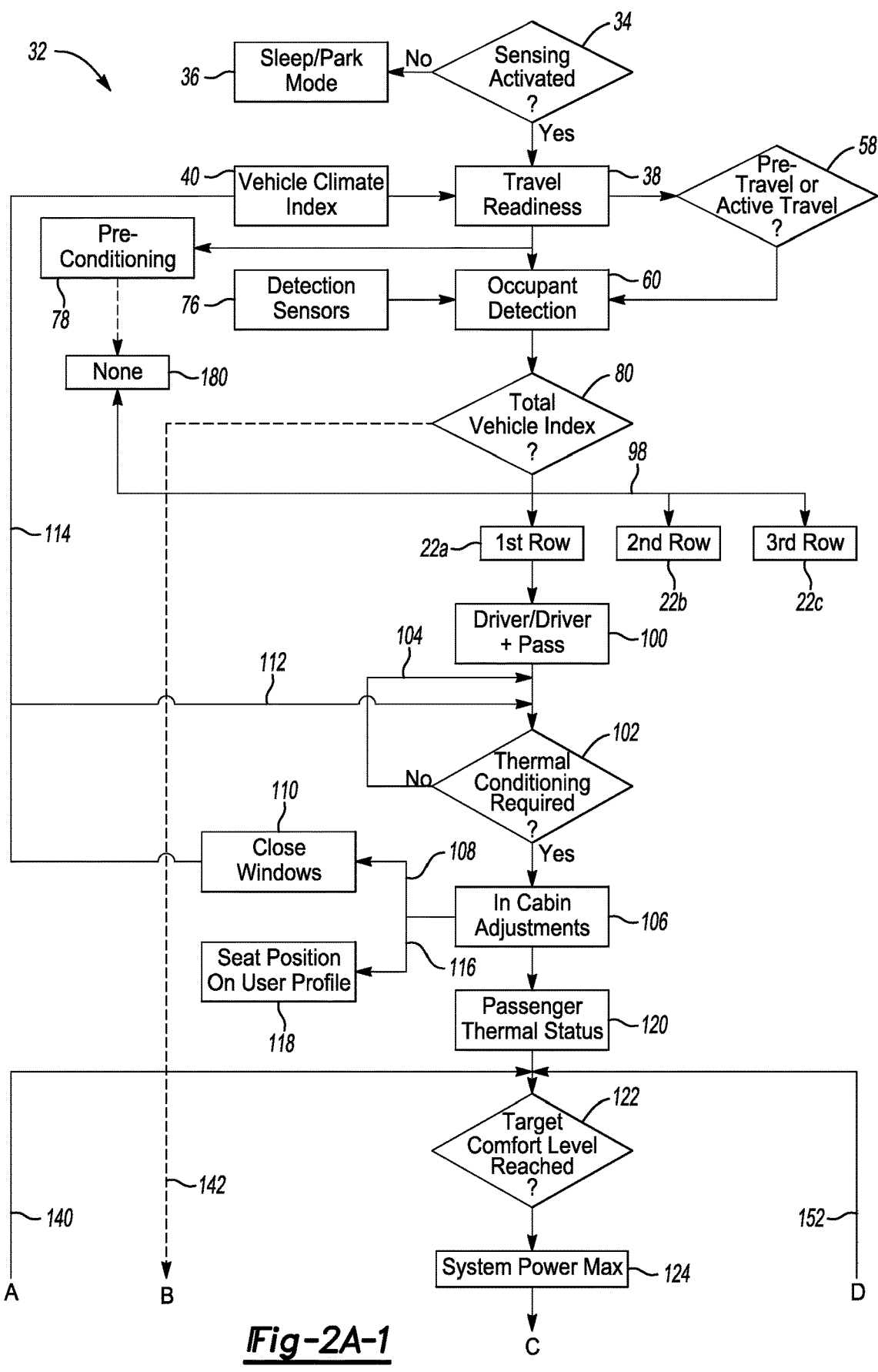

The vehicle includes a system 32 that incorporates at least the features described above, and which comprises a holistic seat climate system that utilizes a plurality of external inputs and internal inputs to provide a desired seat climate while also maintaining other desired vehicle functions. FIGS. 2A1-A2 and FIG. 2-B describe the system and method of achieving a balance between providing the desired seat climate and maintaining other desired vehicle functions. Initially, a determination is made regarding whether sensing has been activated as indicated at 34. In accordance with a determination that sensing has not been activated, it is known that the vehicle is in a sleep/parked mode 36. In accordance with a determination that sensing has been activated, the system proceeds to make a determination of travel readiness 38.

Figure 3:
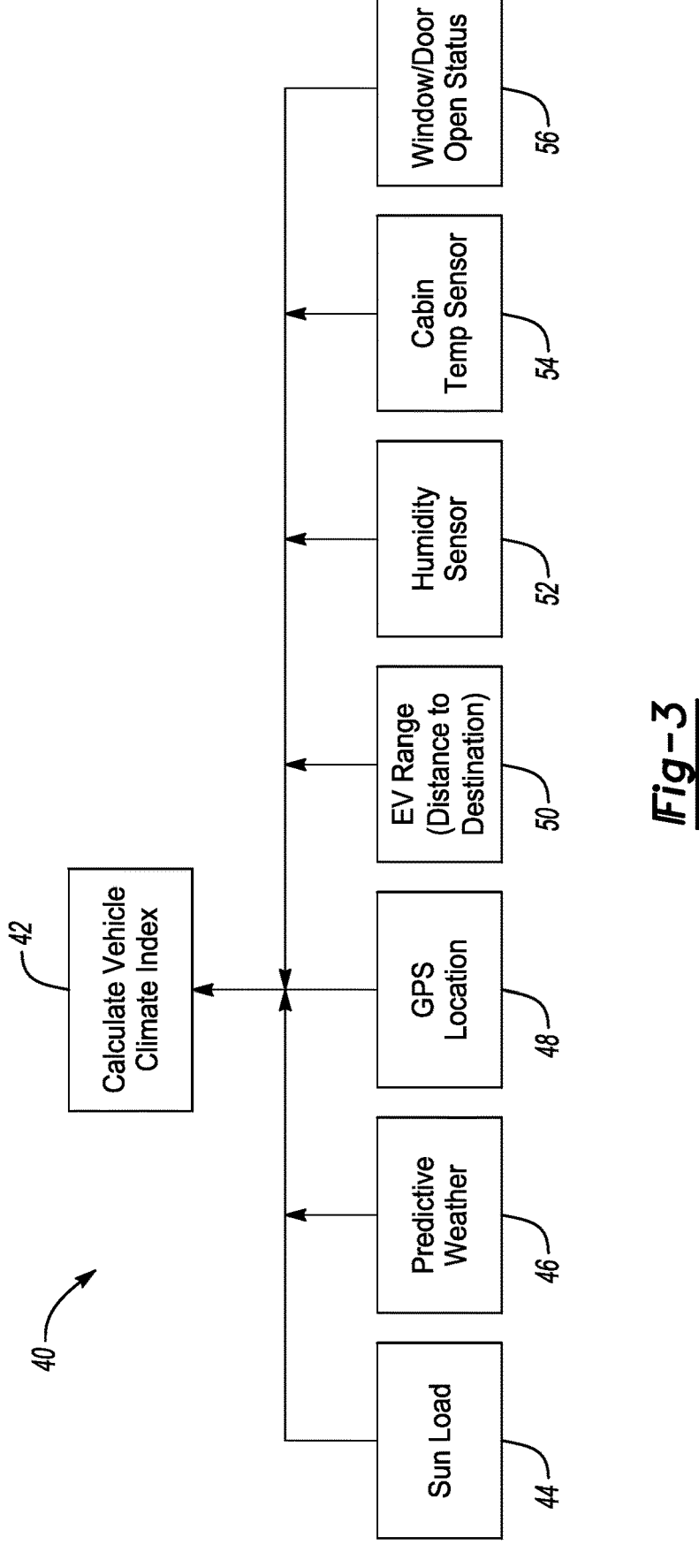
FIG. 3 is a flow diagram of one example for determining a vehicle climate index.

The determination of travel readiness 38 includes an input comprising a vehicle climate index 40. FIG. 3 shows an example of how the vehicle climate index 40 is calculated as indicated at 42. The vehicle climate index 40 is calculated 42 based on a plurality of inputs from one or more of the external sensors (S1, S2, S3 . . . . Sn) and the internal sensors (IS1, IS2, IS3 . . . . ISn). In one example, the vehicle climate index 40 is calculated 42 based on one or more of the following: a sun load 44; predictive weather 46, e.g. determined by accessing one or more external weather databases; a GPS location 48; an electric vehicle range 50, e.g. distance to destination; humidity sensor 52; cabin temperature sensor 54; and/or a window/door open status 56.

Figures 2, 2A:
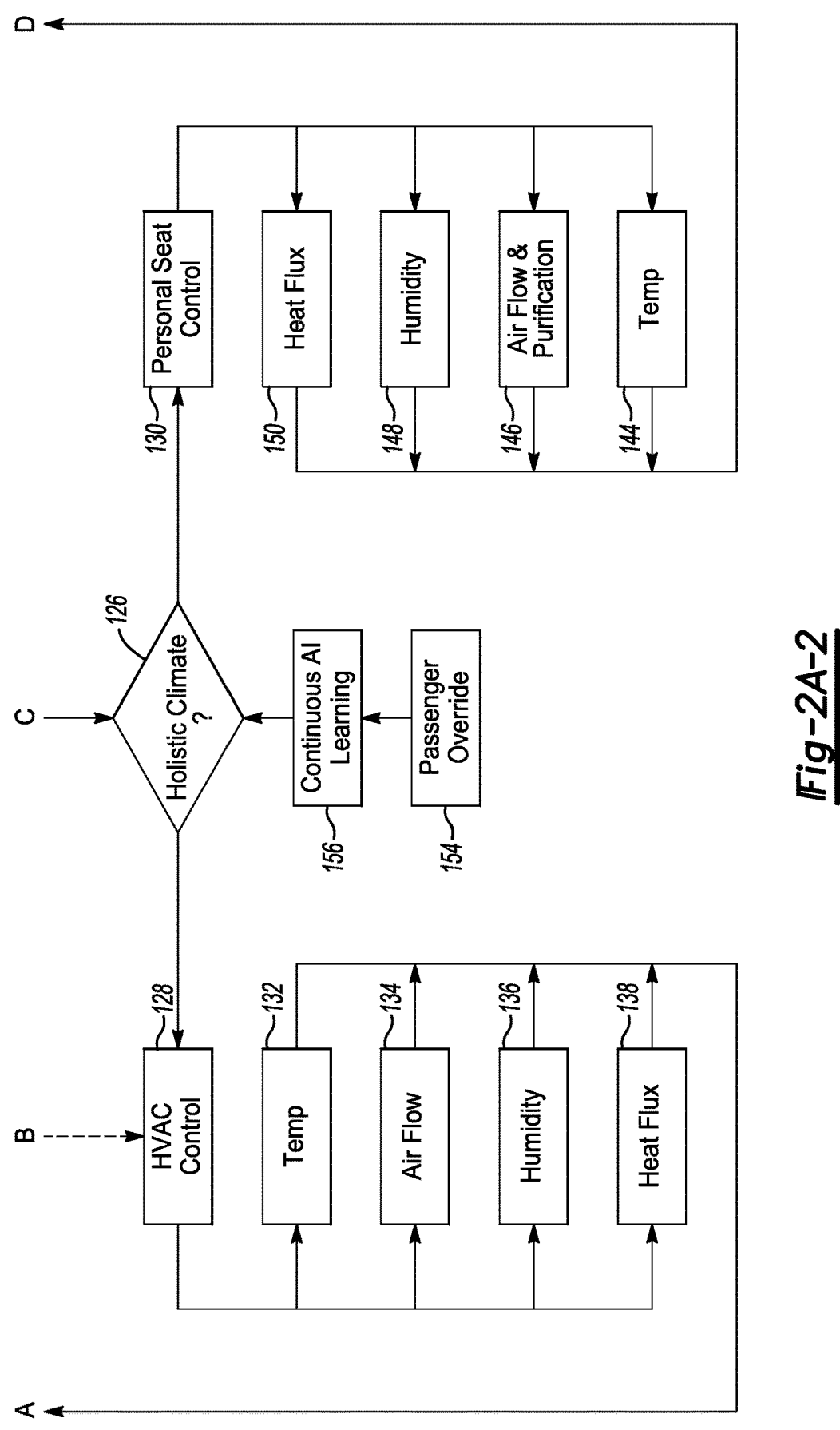
Figure 4:
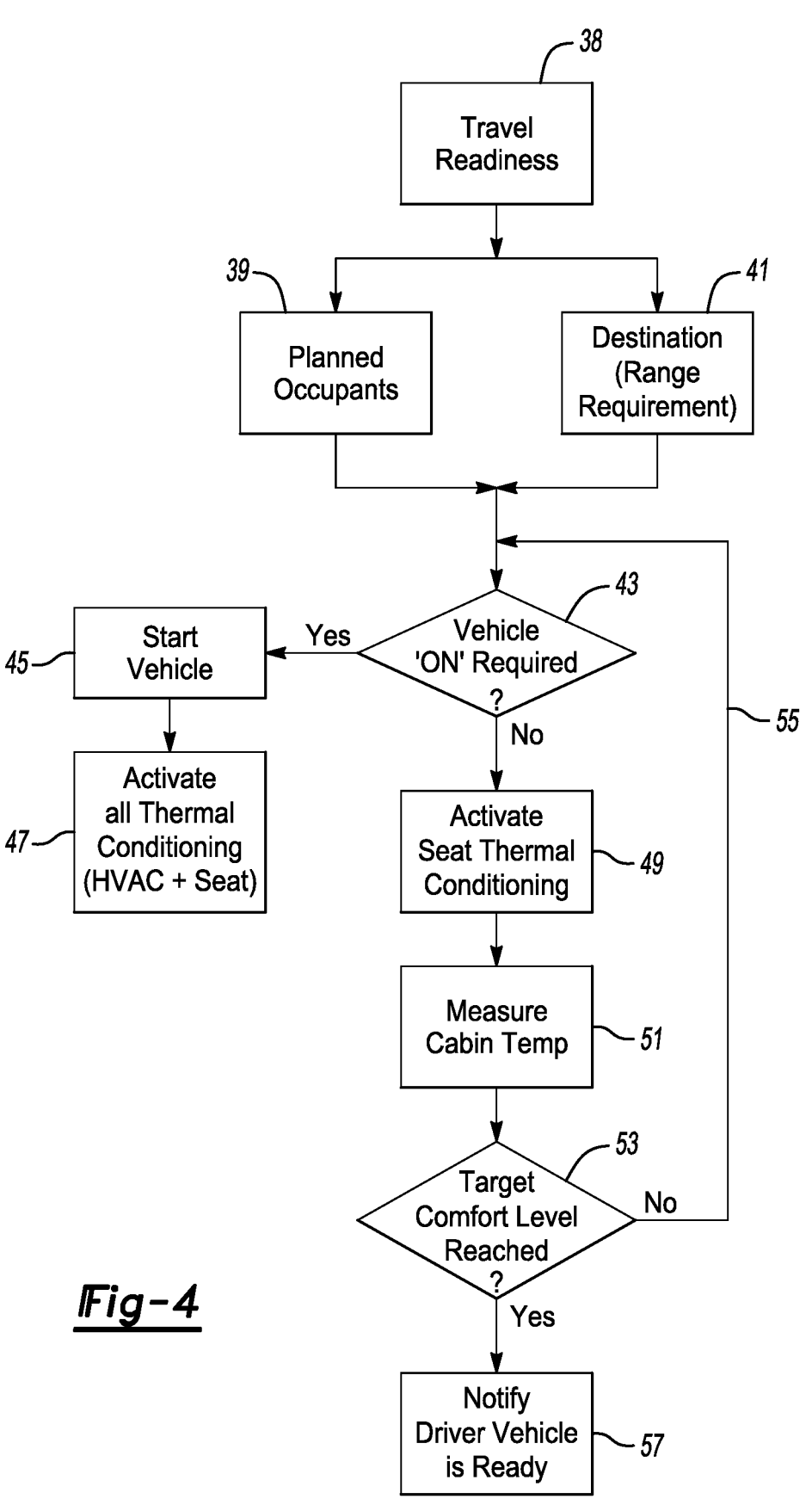
FIG. 4 is a flow diagram of one example for determining travel readiness.

As shown in FIGS. 2A-1 and 2A-2, the vehicle climate index 40 comprises an input to the determination of travel readiness 38. FIG. 4 shows an example of how travel readiness 38 is determined. The travel readiness 38 is determined based on any one, or any combination of, data stored on the one or more controllers 18, data stored remotely of the one or more controllers 18 and accessible via a communication interface, and a plurality of inputs from one or more of the external sensors (S1, S2, S3 . . . . Sn) and the internal sensors (IS1, IS2, IS3 . . . . ISn). In one example, the travel readiness 38 first includes a determination 39 of the number of planned occupants and a determination 41 of a destination. The number of planned occupants can be determined, for example, by detected occupants or by an input provided by a vehicle user. The destination is provided such that a range requirement can be determined via one or more of the controllers 18.

In accordance with a determination of the number of planned occupants, and in accordance with a determination of the range requirement, a combined input is provided such that a determination 43 can be made as to whether or not it is required that the vehicle 10 be in an "ON" condition. In accordance with a determination that an "ON" condition is required, the vehicle 10 is started as indicated at 45 and all thermal conditioning (HVAC 16 and seats 20) is activated as indicated at 47. In accordance with a determination that an "ON" condition is not required, the vehicle 10 remains "OFF", thermal conditioning for the seats 20 is activated as indicated at 49, and cabin temperature is measured as indicated at 51. Once the thermal for the seats 20 has been activated and the cabin temperature has been measured, a determination 53 can be made as to whether a desired target comfort level has been reached for the seats 20. In accordance with a determination that the target comfort level has not been reached, a return is made to to a determination of whether an "ON" condition is required as indicated at 55. This return loop continues until the target comfort level is reached. In accordance with a determination that the target comfort level has been reached, a driver or other identified user is notified that the vehicle 10 is ready as indicated at 57.

Figure 5:
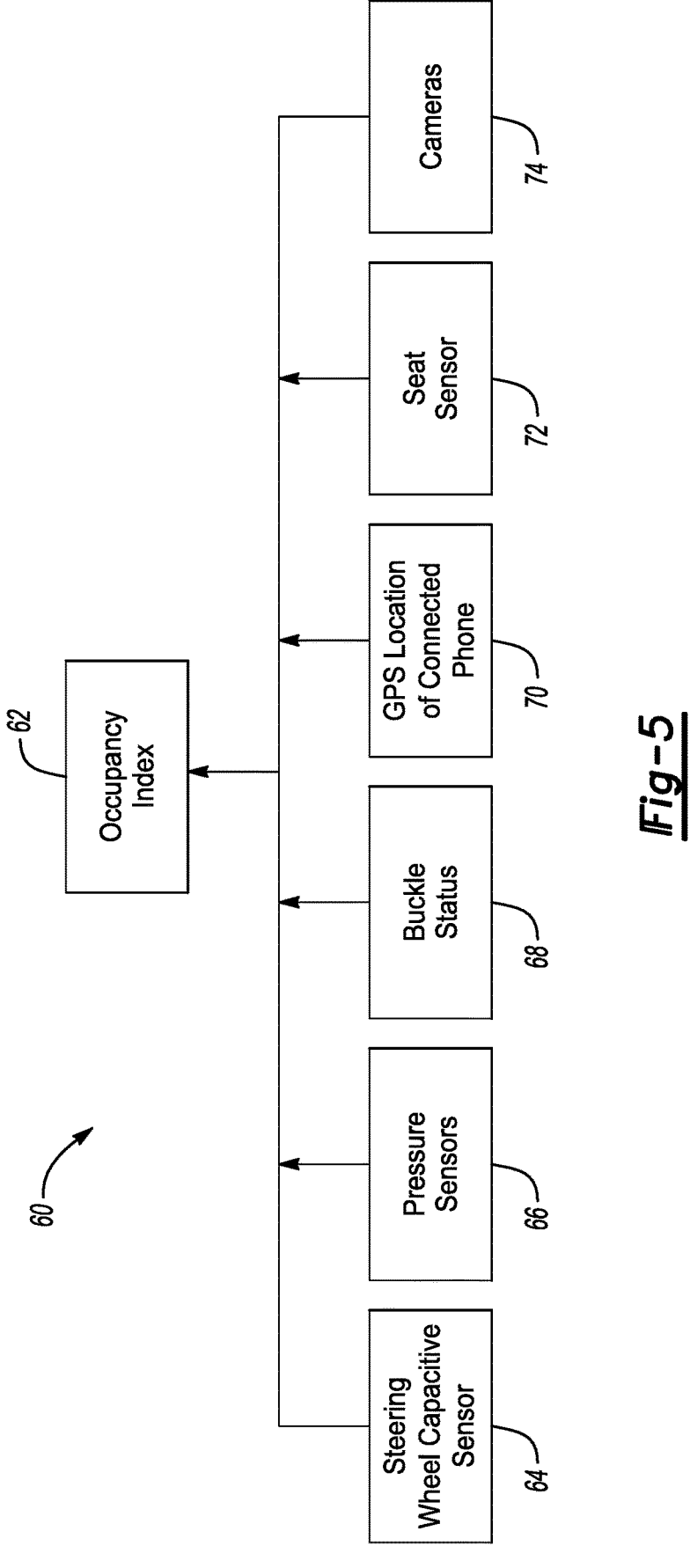
FIG. 5 is a flow diagram of one example for determining an occupancy index.

Once the determination of travel readiness 38 has been considered, a determination can be made as to whether there is a pre-travel condition or active travel condition as indicated at 58 in FIGS. 2A-1 and 2A-2. In accordance with this determination 58, the pre-travel condition or active travel condition is provided as an input to an occupant detection/identification process as indicated at 60. FIG. 5 shows an example of how an occupant index 62 is determined to complete the occupant detection/identification. The occupant index 62 is determined based on a plurality of inputs from one or more of the external sensors (S1, S2, S3 . . . . Sn) and the internal sensors (IS1, IS2, IS3 . . . . ISn). In one example, the occupant index 62 is based on one or more of the following: a steering wheel capacitive sensor 64 associated with the steering wheel 28; pressure sensors 66 associated with the seats 20; a buckle status 68 comprising determination made via a buckle sensor or external sensor such as a camera; GPS location of a connected smart device 70; seat sensors 72; and/or cameras 74. The vehicle occupant index 62 utilizing one or more of the detection sensors 64-74 comprises an input to the occupant detection/identification process 60 as indicated at 76. The determination of the vehicle occupant index 62 is used to determine the actual number of vehicle occupants as compared to the number of planned occupants identified in the determination of travel readiness 38, as the number of actual occupants may differ from the number of planned occupants.

Additionally, there may be a determination of whether any pre-conditioning of the vehicle should occur is also considered as indicated at 78. In one example, the pre-conditioning 78 is considered prior to a determination of the occupant detection/identification process 60. This possibility of pre-conditioning 78 will be discussed in greater detail below.

Figure 6:
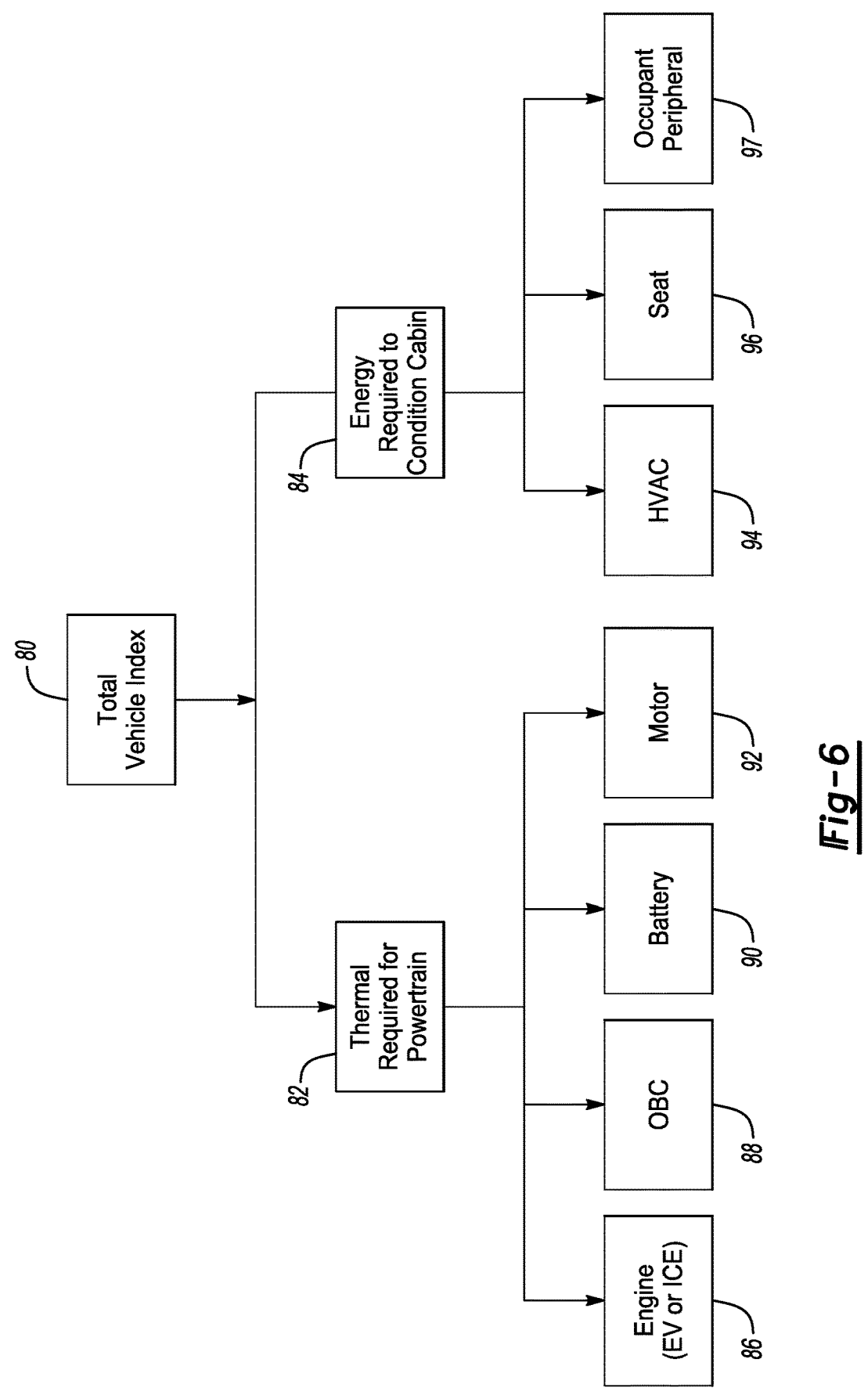
FIG. 6 is a flow diagram of one example for determining a total vehicle index.

In accordance with a determination of a pre-travel condition or active travel condition, and in accordance with a determination of occupant detection/identification 60, a combined input of this data is provided for consideration of a total vehicle index 80. FIG. 6 shows an example of how the total vehicle index 80 is determined. The total vehicle index 80 is determined based on any one, or any combination of, data stored on the one or more controllers 18, data stored remotely of the one or more controllers 18 and accessible via a communication interface, and a plurality of inputs from one or more of the external sensors (S1, S2, S3 . . . . Sn) and the internal sensors (IS1, IS2, IS3 . . . . ISn). In one example, the total vehicle index 80 first includes a determination of an amount of energy needed to provide thermal required for the various powertrain components (P1, P2 . . . . Pn) as indicated at 82, and also includes a determination of an amount of energy required to condition the cabin 12 as indicated at 84. In one example, the determination 82 for thermal required for the various powertrain components (P1, P2 . . . . Pn) includes an energy determination for one or more of the following: an engine (EV or ICE); an On Board Charger (OBC) or other power electronics 88; a battery 90; and/or a motor 92. In one example, the determination 84 for the amount of energy required to condition the cabin 12 includes an energy determination 94 for the HVAC, an energy determination 96 for seats identified as requiring thermal conditioning, and/or an energy determination 97 for occupant peripherals, e.g. steering wheel, lower leg, door armrest, central console, etc.

Next, an identification of occupied rows is made as indicated at 98, i.e. an identification is made as to whether there are no occupied rows, one occupied row, two occupied rows, etc. Further, the identification 98 also determines which rows 22a, 22b, 22c, are occupied. FIGS. 2A-1 and 2A-2 shows an example where the front row 22a is identified as being occupied, and further discloses steps taken once this determination is made. Steps that occur for the identification of additional occupied rows will be discussed below in reference to FIG. 2B.

For the first/front row 22a, a determination is made as to whether there is a driver and a passenger or just a driver alone as indicated at 100. Next, a determination 102 is made as to whether thermal conditioning is required. The thermal conditioning can be by request or can be condition based. In accordance with a determination that no thermal conditioning is required, there is a return, as indicated at 104, to an input to the determination 102 of whether thermal conditioning is required to continuously monitor as to whether any thermal conditioning requests have been initiated or whether any conditions for thermal conditioning have changed. In accordance with a determination that thermal conditioning is required, there is a determination of whether in-cabin adjustments are to be made, as indicated at 106.

In cabin adjustments 106 can include, for example, determining a window open/close status via a window sensor as indicated at 108. Based on the thermal conditioning requirements a determination may be made that one or more windows should be closed as indicated at 110. This change in window status will be communicated and returned back, as indicated at 112, to an input to the determination 102 of whether thermal conditioning is required. This change in window status will also be communicated and returned back, as indicated at 114, to an input to the determination of the vehicle climate index 40. For example, closing one or more windows can affect measurements made by the humidity sensor 52, as well as temperature measurements made by external sensors, internal cabin climate sensors, and seat sensors. Updated data is then provided for the determination of the vehicle climate index 40.

In cabin adjustments 106 can also include, for example, determining seat position using a seat track sensor, for example, as indicated at 116. Adjustments of seat position can then be made based on a user profile as indicated at 118.

Next, a passenger thermal status is determined for each seat occupant as indicated at 120. This comprises an affordance that can be done in any number of ways. For example, the passenger thermal status can be based on receiving input indicative of a desired thermal comfort setting associated with the seat, a predetermined setting based on an occupant/user profile, and/or a preset level that could be based on GPS location, time of day, or time or year, for example. Also the GPS location sensor can be used to determine an amount of time that an associated user has been outside the vehicle.

Next, a determination 122 is made as to whether a target comfort level has been reached. In accordance with a determination that the target comfort level has not been reached the HVAC thermal output and/or seat position and/or seat thermal conditioning can be selectively adjusted to reach the target comfort level.

A determination 124 is made of a maximum power available for the system. This determination is made for heating and cooling functions. The maximum available power is then provided as an input to a holistic climate 126 where various determinations are made in order to balance thermal needs between powertrain requirements, HVAC requirements for the overall environment, and microenvironments for each seat. This would involve calibration of HVAC thermal and seat thermal to achieve the comfort specification. The holistic climate 126 thus provides a first output for HVAC control as indicated at 128 and a second output for personal seat control as indicated at 130.

For HVAC control 128, one or more of the following characteristics are considered: temperature 132; air flow 134; humidity 136; and/or heat flux 138. Data concerning temperature 132, air flow 134, humidity 136, and/or heat flux 138 is communicated back, as indicated at 140 to combine with an output from the determination of the passenger thermal status 120 to provide updated data as an input to the determination 122 of whether the target comfort level has been reached. Additionally, for HVAC control 128 information/data regarding the total vehicle index 80 can be provided as an input as indicated at 142.

For personal seat control 130, one or more of the following characteristics are considered: temperature 144; air flow and purification 146; humidity 148; and/or heat flux 150. Data concerning temperature 144, air flow 146, humidity 148, and/or heat flux 150 is communicated back, as indicated at 152 to combine with an output from the determination of the passenger thermal status 120 to provide updated data as an input to the determination 122 of whether the target comfort level has been reached.

In one example, additional inputs such as a passenger override 154 and/or continuous artificial intelligence (AI) learning 156 can be utilized to further assist in controlling the balance between the various requirements.

Figure 2B:
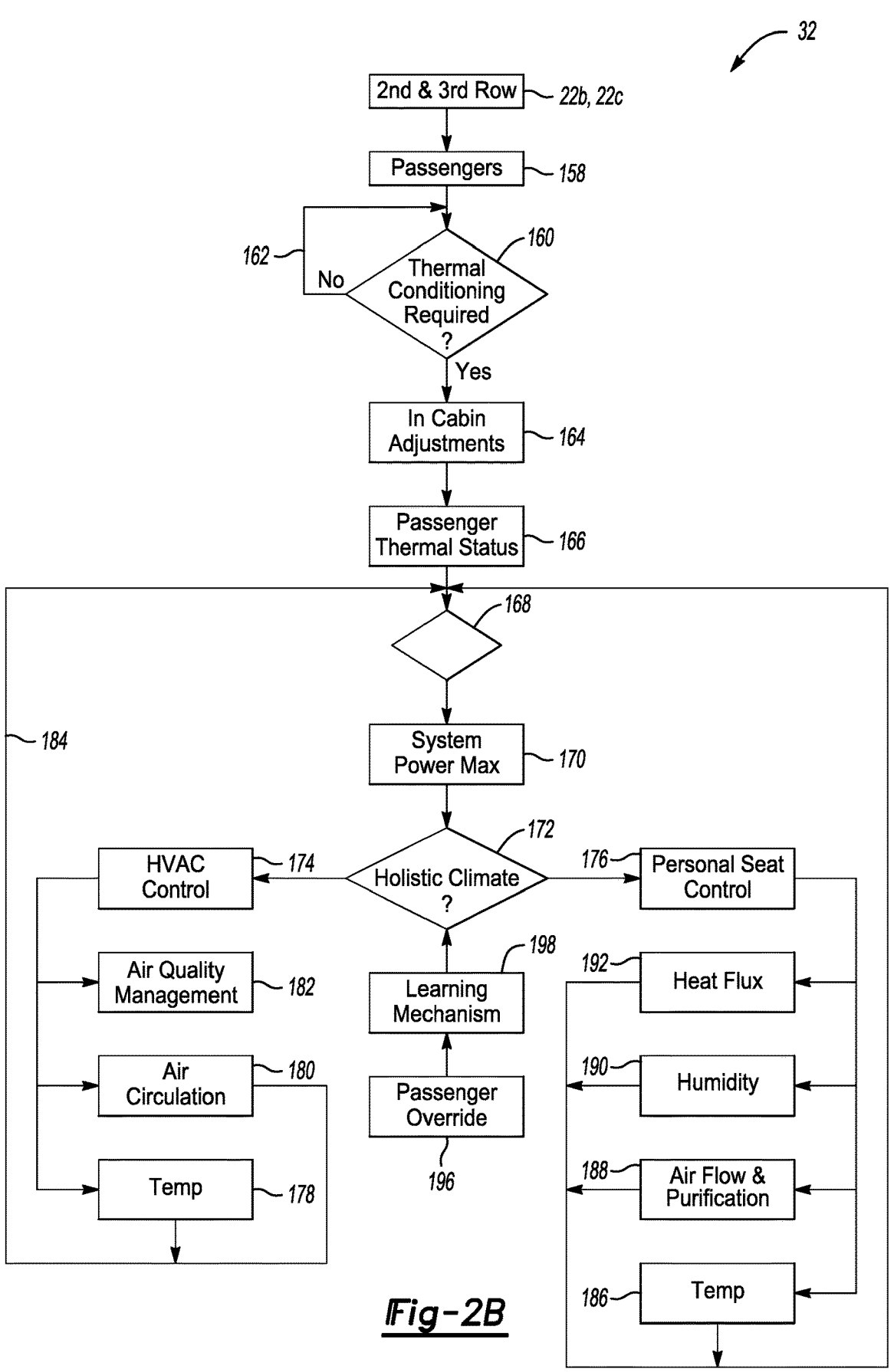
FIG. 2B is a continuation of the flow diagram of FIGS. 2A-1 and 2A-2 for additional rows of seating.

FIG. 2B shows the system and method for holistic climate balancing for additional rows, e.g. second 22b and third 22c rows, of the vehicle that include seat occupants. First, a determination of the number and location of seated occupants made as indicated at 158. Next, a determination 160 is made as to whether thermal conditioning is required. The thermal conditioning can be by request or can be condition based. In accordance with a determination that no thermal conditioning is required, there is a return, as indicated at 162, to an input to the determination 102 of whether thermal conditioning is required to continuously monitor as to whether any thermal conditioning requests have been initiated or whether any conditions for thermal conditioning have changed. In accordance with a determination that thermal conditioning is required, there is a determination of whether in-cabin adjustments are to be made, as indicated at 164. The in-cabin adjustments 164 can be made in a similar manner to the in-cabin adjustments 106 as shown in FIGS. 2A-1 and 2A-2.

Next, a passenger thermal status is determined for each seat occupant as indicated at 166. This comprises an affordance that can be done in any number of ways. For example, the passenger thermal status can be based on receiving input indicative of a desired thermal comfort setting associated with the seat, a predetermined setting based on an occupant/user profile, and/or a preset level that could be based on GPS location, time of day, or time or year, for example. Also the GPS location sensor can be used to determine an amount of time that an associated user has been outside the vehicle.

Next, a determination 168 is made as to whether a target comfort level has been reached. In accordance with a determination that the target comfort level has not been reached the HVAC thermal output and/or seat position and/or seat thermal conditioning can be selectively adjusted to reach the target comfort level.

A determination 170 is made of a maximum power available for the system. This determination is made for heating and cooling functions. The maximum available power is then provided as an input to a holistic climate 172 where various determinations are made in order to balance thermal needs between powertrain requirements, HVAC requirements for the overall environment, and microenvironments for each seat. The holistic climate 172 thus provides a first output for HVAC control as indicated at 174 and a second output for personal seat control as indicated at 176.

For HVAC control 174, one or more of the following characteristics are considered: temperature 178; air flow/circulation 180; and/or air quality 182. Data concerning temperature 178, air flow/circulation 180, and/or air quality 182 is communicated back, as indicated at 184 to combine with an output from the determination of the passenger thermal status 166 to provide updated data as an input to the determination 168 of whether the target comfort level has been reached. Additionally, for HVAC control 174 information/data regarding the total vehicle index 80 can be provided as an input in a manner similar to that as shown in FIGS. 2A-1 and 2A-2.

For personal seat control 176, one or more of the following characteristics are considered: temperature 186; air flow and purification 188; humidity 190; and/or heat flux 192. Data concerning temperature 186, air flow 188, humidity 190, and/or heat flux 192 is communicated back, as indicated at 194 to combine with an output from the determination of the passenger thermal status 166 to provide updated data as an input to the determination 168 of whether the target comfort level has been reached.

In one example, additional inputs such as a passenger override 196 and/or continuous artificial intelligence (AI) learning 198 can be utilized to further assist in controlling the balance between the various requirements.

Figure 10A:
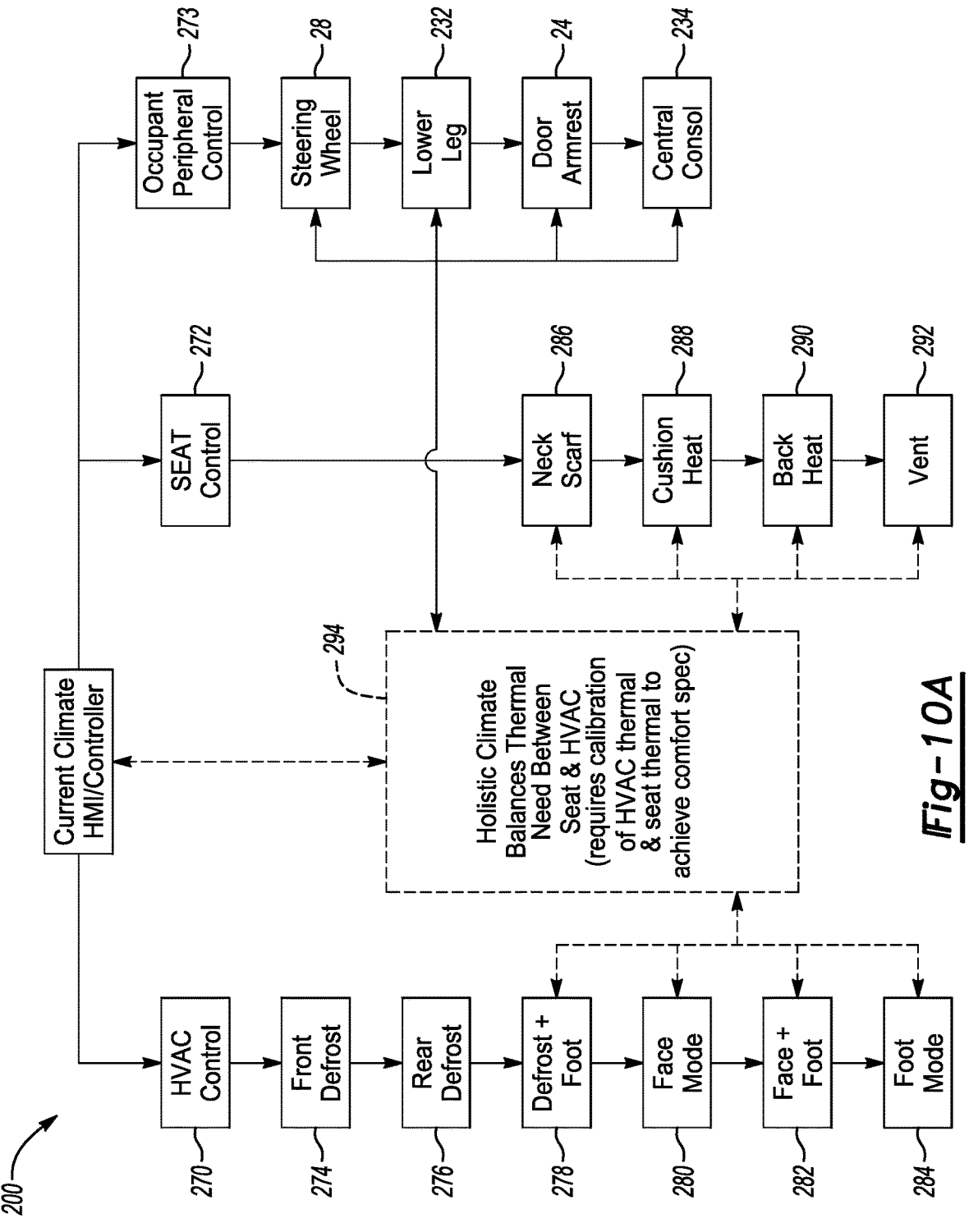
FIG. 10A is a schematic diagram of one example of control logic for balancing control between seat climate and HVAC.
Figure 10B:
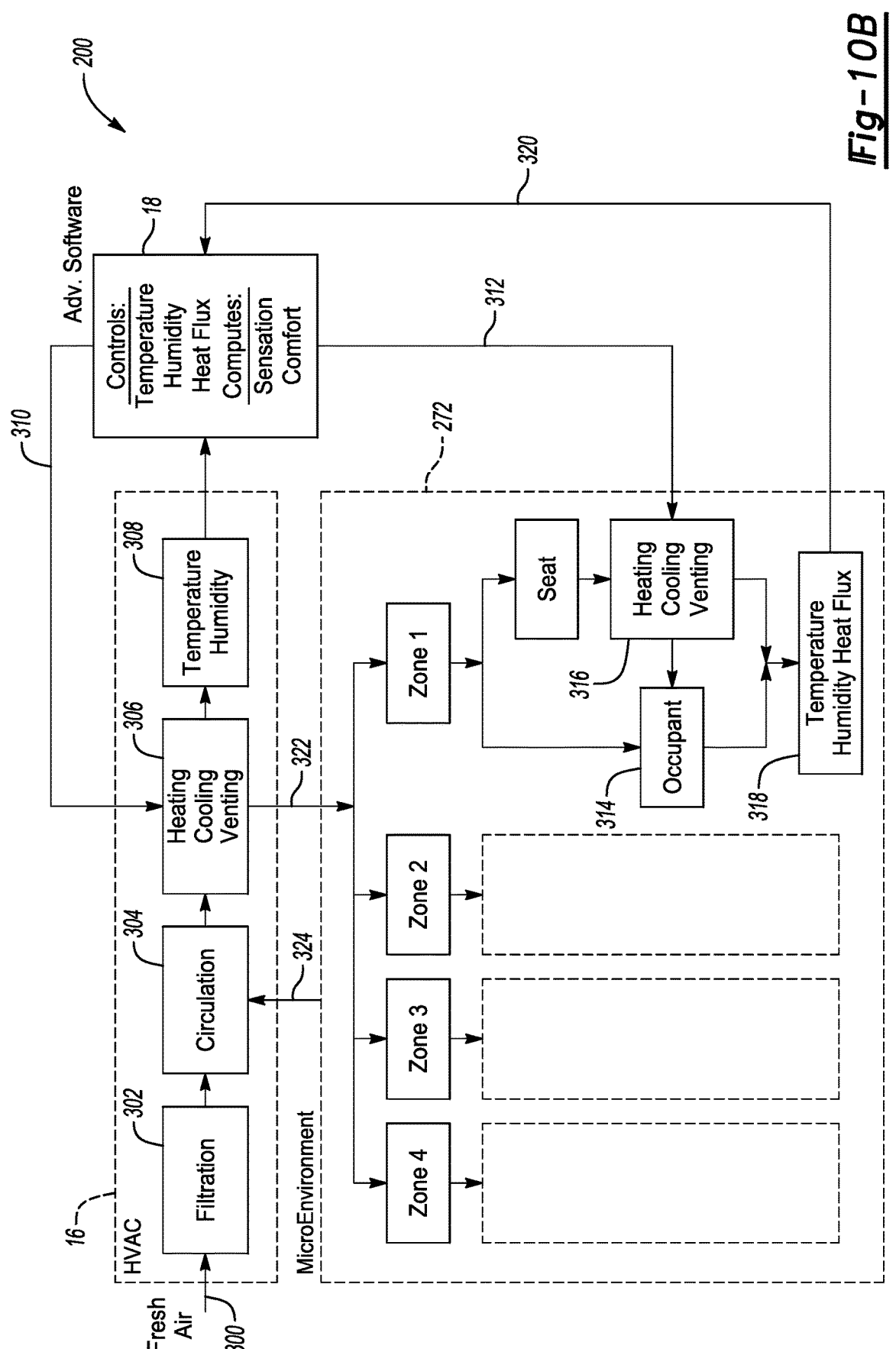
FIG. 10B is a schematic diagram of one example of control logic for controlling a balance between the HVAC and multiple seat zones.

In one example, the holistic balancing for all rows of seats can occur simultaneously and continuously until each target comfort level is reached. Further, once target comfort levels are reached, continuous monitoring and updating occurs to respond to any requests/conditions that would require adjustment of the initially achieved target comfort level. An example of flow control logic 200 is shown in FIGS. 10A-B.

Figure 7:
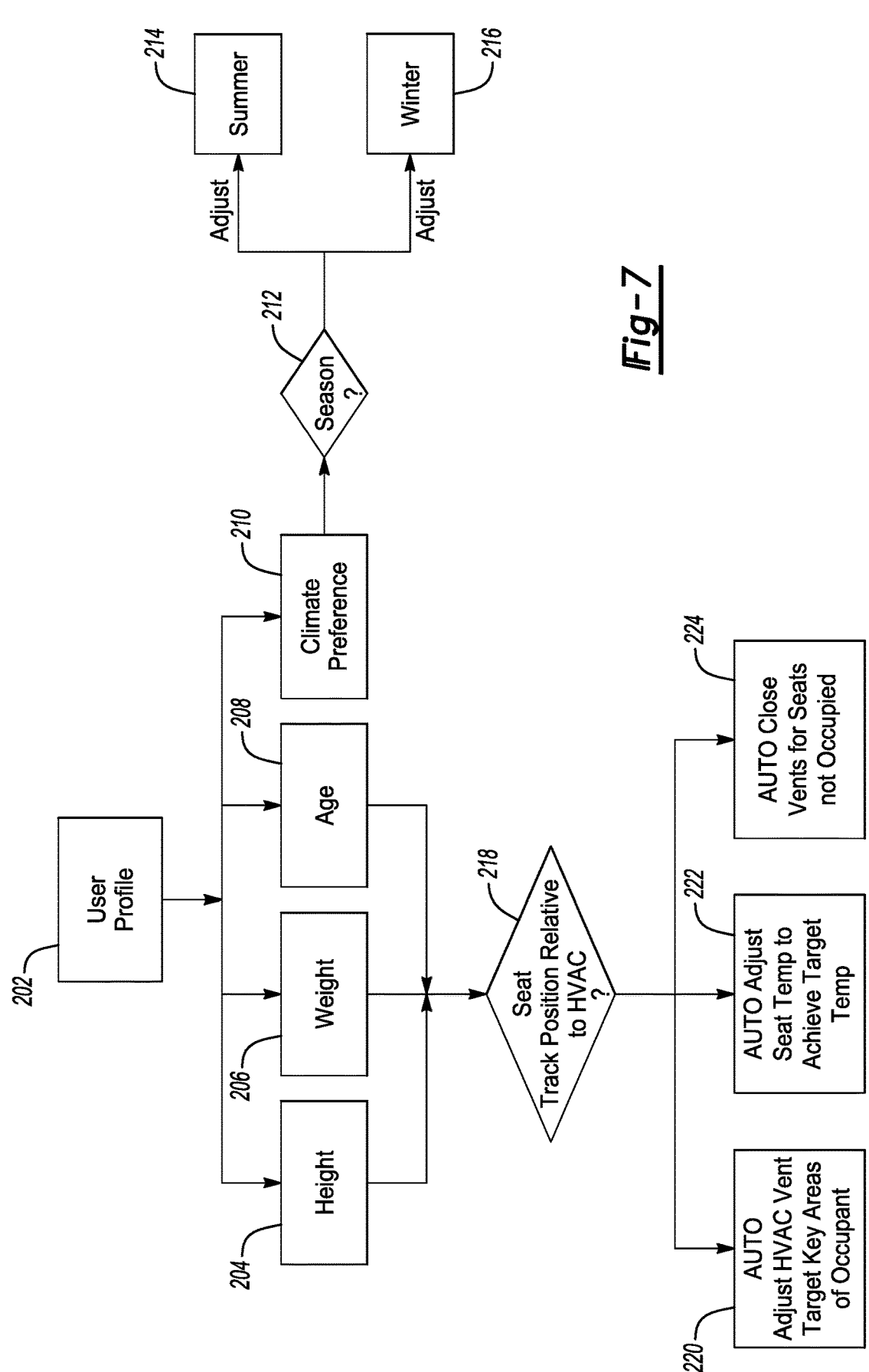
FIG. 7 is a flow diagram of one example for determining a user profile.

FIG. 7 shows one example of how a user profile 202 is compiled to comprise an input as a determination for target comfort levels for HVAC and seating purposes. In one example, the user profile 202 comprises one or more of the following: height 204; weight 206; age 208; and climate preference 210. This data can be supplied by a user via any type of input, e.g. smart device to the system 32, or can be provided by one or more sensors such as a camera, for example. Climate preference 210 can be made based on a determination of the type of season as indicated at 212. In accordance with a determination of the type of season, summer 214 or winter 216 for example, adjustments can be automatically made to the climate preference 210.

Data from the user profile concerning height 204, weight 206, and age 208, can be used to determine an appropriate seat track position relative to at least one HVAC output as indicated at 218. As such, the user profile 202 provides ergonomic data of what the optimum location of the occupant with respect to the HVAC/seat and cabin. In accordance with a determination that the current seat/temperature status does not comply with the user profile, the HVAC 16 can be automatically adjusted as indicated at 220 and/or the seat temperature can be automatically adjusted as indicated at 222 and/or seat position/HVAC vent position can be adjusted. Adjusting the HVAC outputs can involve automatically adjusting HVAC vent outputs to target key areas of the occupant, for example. Adjusting seat temperature can involve automatically adjusting temperatures of one or more seat thermal elements in selected locations, for example. In accordance with a determination that a seat is unoccupied, HVAC outputs associated with that seat can be automatically closed as indicated at 224.

Figures 8, 9:
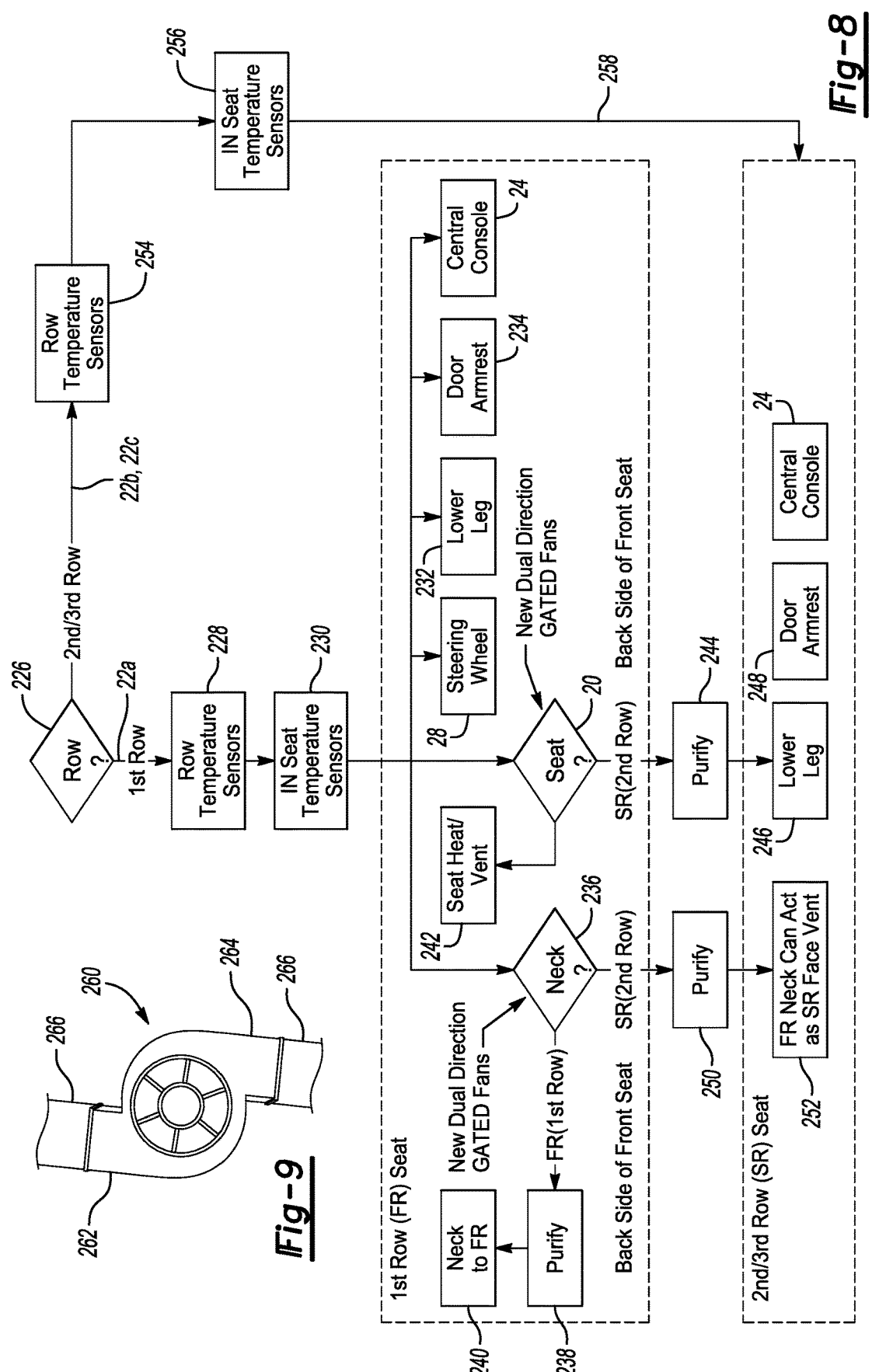
FIG. 8 is a flow diagram of one example for controlling seat climate from areas around the seat.
FIG. 9 is a schematic view of one example of a dual direction fan.

FIG. 8 shows one example of areas around the seats in the various rows that can be used to assist/adjust controlling the target comfort level for each seated occupant. For example, each row is identified as indicated at 226. For the first/front row 22a, data from first row temperature sensors 228 and data from in-seat temperature sensors 230 for the first row seats are provided as inputs to determine adjustments. Areas around the seat 20, e.g. occupant peripherals, that can be adjusted include one or more of the following: steering wheel 28; lower leg 232; door armrest 234; central console 24; and/or neck area 236. Any of these areas can be provided with thermal outputs that can be directed to adjust temperatures as determined relative to comfort target levels.

As shown at 238 in FIG. 8, after purification, air can be directed to the neck area in the front row 22a, as indicated at 240. With regard to the associated seat 20, in one example, seat heat/vents are utilized to control temperatures as indicated at 242. Further, the back/rear side of a front seat can direct air, after purification 244, to a lower leg region of a rear seat as indicated at 246. Door armrest areas 248 and the center console 24 can also be used to adjust temperatures at the rear seat. Additionally, the back/rear side of a neck area 236 associated with a front seat can direct air, after purification 250, to a rear side seat vent to control temperature around a microenvironment of a rear seat occupant as indicated at 252.

For identifications of the additional rows 22b, 22c, respective data from the row temperature sensors 254 and data from in-seat temperature sensors 256 for the back row seats are provided as inputs to determine adjustments. The adjustments can be made in a manner similar that as described with regard to the front row adjustments as indicated at 258.

FIG. 9 shows one example of a dual direction fan 260 that can be used in a seat or other location within the vehicle to direct thermal flow as needed. The fan 260 has a first output 262 for one direction and a second output 262 for a second, different, direction. The controller 18 can be used to control the direction based on the optimum determined control strategy for achieving the target comfort level. The fan 260 can include ducts 266 or other similar structures to define various flow paths throughout the seats and/or through other vehicle structures around the seats. The ducts 266 can be flexible or rigid to achieve desired packaging arrangements.

Thermal comfort system components such as those disclosed in FIG. 8, for example, utilize heating, cooling, and ventilation to provide thermal comfort for all seating positions. As discussed above, air flow is an important HVAC characteristic for perceived thermal performance, and this can be achieved by repurposing existing components. While the second row occupants may have seat vent/heat/cool associated with their respective seat, it is important to be able to further enhance occupant comfort by using additional options that are provided front row seats.

Figures 11A, 11B:
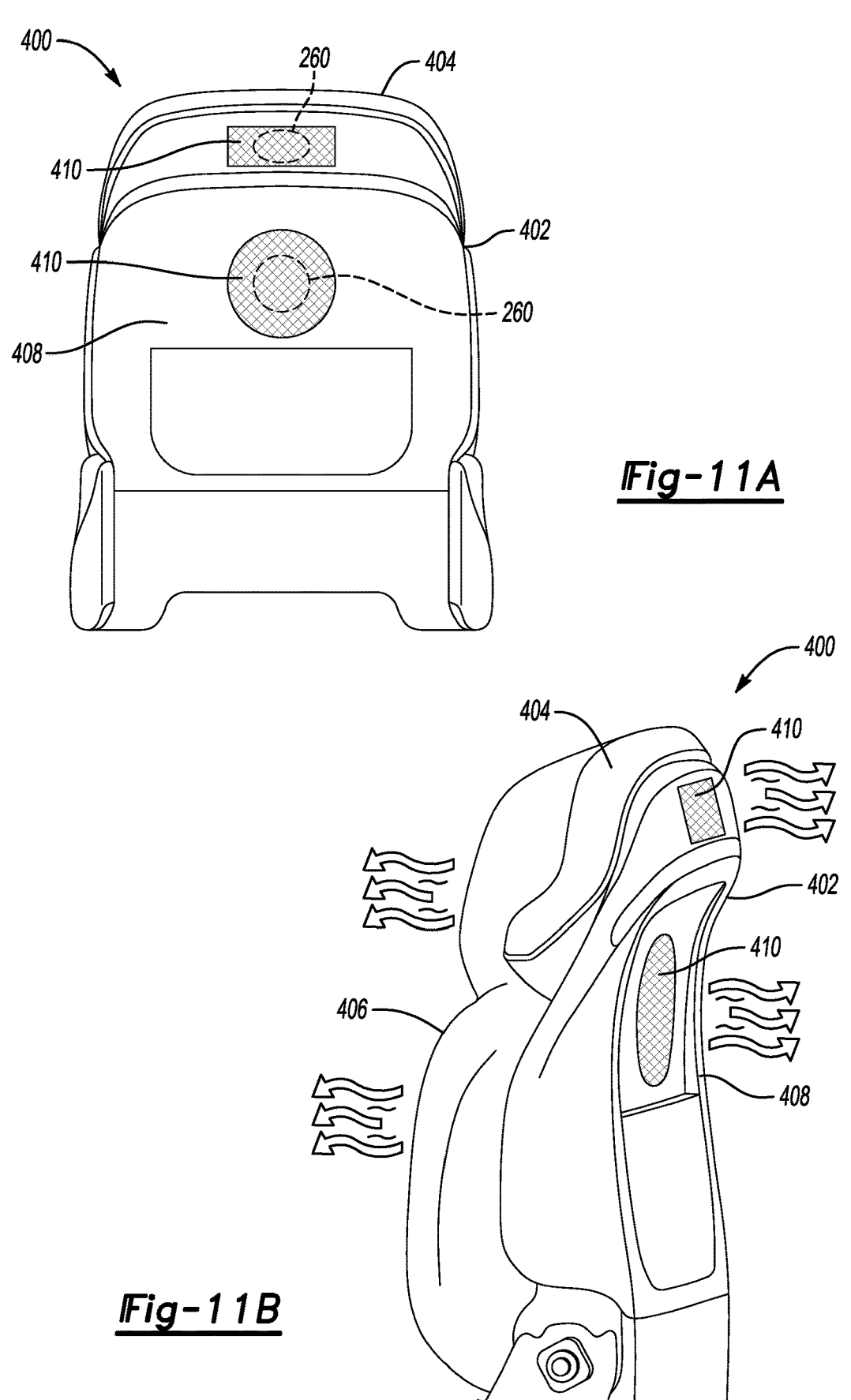
FIG. 11A is a rear view of a seat back with a fan.
FIG. 11B is a side perspective view of the seat back of FIG. 11A.

FIGS. 11A-B disclose one example of a seat 400 that utilizes one or more fans 260 to increase air flow to a next row, e.g. rear row, occupant. In this example, the seat 400 comprises a seat back 402 combined with a head restraint portion 404. The seat back 402 comprises a pelvic/lumbar seating surface and a thoracic/shoulder seating surface positioned below the head restraint portion 404, and may include a pair of laterally spaced apart side bolster regions. It should be understood that the seat back shown in the figures is just one example of a seat back configuration, and that other configurations could also be utilized.

In the example shown, the seat back 402 comprises a forward facing surface 406 and a rearward facing surface 408. The rearward facing surface 408 includes one or more air flow outlets 410 that can be located in various locations as needed. In the example shown, there is at least one air flow outlet 410 in a lower portion of the rearward facing surface 408 of the seat back 402 and another air flow outlet 410 in the head restraint portion 404 of the rearward facing surface 408 of the seat back 402. The air flow outlets 410 can comprise a single opening, a plurality of discrete openings, or a mesh or louvered surface, for example.

In this configuration, for example one or more first row fans 260 are used to redirect flow from the first row to the second row via the air flow outlets 410. The fan speed is controllable in both directions and air flow can be directed in multiple directions, e.g. forward and rearward directions, as indicated by the arrows in FIG. 11B. In one example multiple user choice settings can be provided, e.g., high, medium, low. Additionally, a "boost" mode may also be provided under pre-defined conditions, e.g. a high speed mode where sound is not limited. A seat back user interface may also include an adjustable direction of airflow.

Figures 12A, 12B:
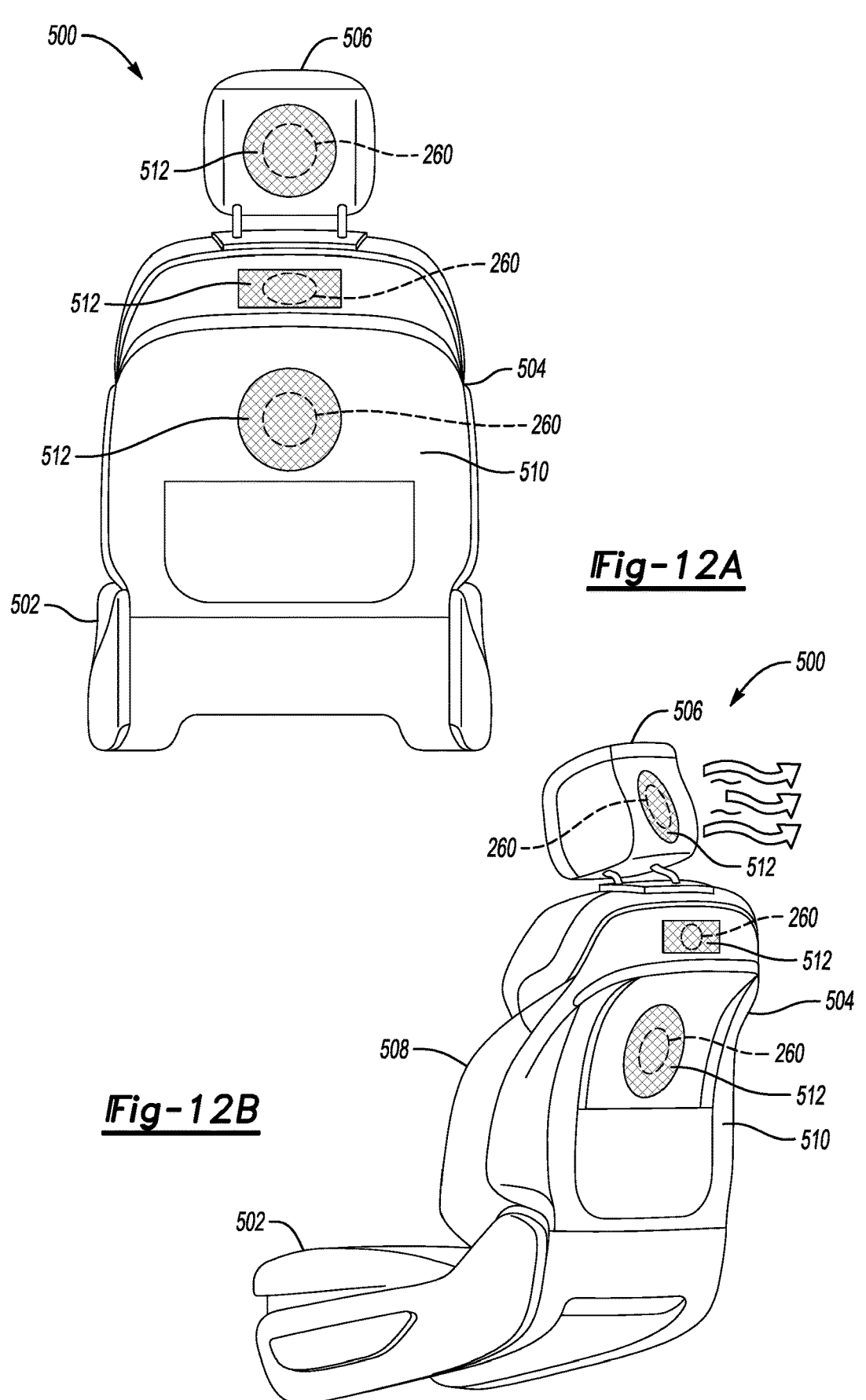
FIG. 12A is a rear view of a seat headrest with a fan.
FIG. 12B is a side perspective view of the seat headrest of FIG. 12A.

FIGS. 12A-B disclose one example of a seat 500 that utilizes one or more fans 260 to increase air flow to a next row, e.g. rear row, occupant. In this example, the seat 500 comprises a seat cushion 502 and a seat back 504 mounted for pivoting movement relative to the seat cushion 502. A headrest 506 is attached to the seat back 504. The seat back 504 comprises a pelvic/lumbar seating surface and a thoracic/shoulder seating surface, and may include a pair of laterally spaced apart side bolster regions. It should be understood that the seat shown in the figures is just one example of a seat configuration, and that other configurations could also be utilized.

In the example shown, the seat back 504 comprises a forward facing surface 508 and a rearward facing surface 510. The rearward facing surface 510 includes one or more air flow outlets 512 that can be located in various locations as needed. In the example shown, there is at least one air flow outlet 512 in a lower portion of the rearward facing surface 510 of the seat back 504 (e.g., lower/upper back region), another air flow outlet 512 in an upper portion of the rearward facing surface 510 of the seat back 504 (e.g., shoulder or neck region), and another air flow outlet 512 in the headrest 506 of the rearward facing surface 510 of the seat back 504 (e.g., head region). The air flow outlets 512 can comprise a single opening, a plurality of discrete openings, or a mesh or louvered surface, for example.

In this configuration, for example one or more first row fans 260 are used to redirect flow from the first row to the second row via the air flow outlets 512. The fan speed is controllable in both directions and air flow can be directed in multiple directions, e.g. forward and rearward directions. In one example multiple user choice settings can be provided, e.g., high, medium, low. Additionally, a "boost" mode may also be provided under pre-defined conditions, e.g. a high speed mode where sound is not limited. A seat back user interface may also include an adjustable direction of airflow.

Figures 13A, 13B:
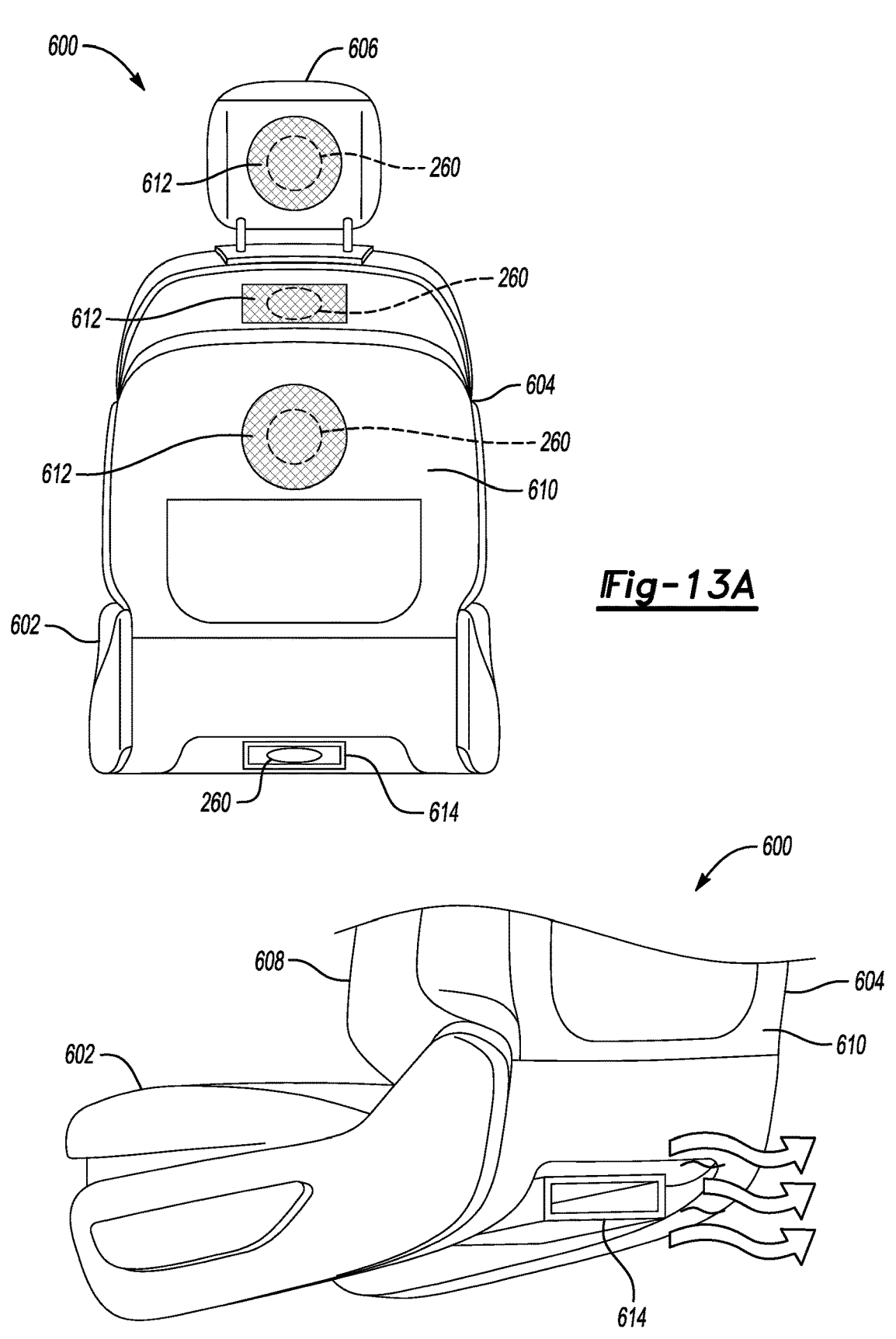
FIG. 13A is a rear view of a seat cushion with a fan.
FIG. 13B is a side perspective view of the seat cushion of FIG. 13A.

FIGS. 13A-B disclose one example of a seat 600 that utilizes one or more fans 260 to increase air flow to a next row, e.g. rear row, occupant. In this example, the seat 600 comprises a seat cushion 602 and a seat back 604 mounted for pivoting movement relative to the seat cushion 602. A headrest 606 is attached to the seat back 604. The seat back 604 comprises a pelvic/lumbar seating surface and a thoracic/shoulder seating surface, and may include a pair of laterally spaced apart side bolster regions. It should be understood that the seat shown in the figures is just one example of a seat configuration, and that other configurations could also be utilized.

In the example shown, the seat back 604 comprises a forward facing surface 608 and a rearward facing surface 610. The rearward facing surface 610 includes one or more air flow outlets 612 that can be located in various locations as needed. In one example, one or more air outlets 614 are provided that are associated with the seat cushion 602. Also, in the example shown, there is at least one air flow outlet 612 in a lower portion of the rearward facing surface 610 of the seat back 604 (e.g., lower/upper back region), another air flow outlet 612 in an upper portion of the rearward facing surface 610 of the seat back 604 (e.g., shoulder or neck region), and another air flow outlet 612 in the headrest 606 of the rearward facing surface 610 of the seat back 604 (e.g., head region). The air flow outlets 612 can comprise a single opening, a plurality of discrete openings, or a mesh or louvered surface, for example. The air flow outlet 614 associated with the seat cushion 602 can comprises one or more duct openings or one or more cushion openings, or a combination thereof, for example.

In this configuration, for example one or more first row fans 260 are used to redirect flow from the first row to a second row upper body area and/or a footwell area via the respective air flow outlets 612, 614. The fan speed is controllable in both directions and air flow can be directed in multiple directions, e.g. forward and rearward directions. In one example multiple user choice settings can be provided, e.g., high, medium, low. Additionally, a "boost" mode may also be provided under pre-defined conditions, e.g. a high speed mode where sound is not limited. A seat back user interface may also include an adjustable direction of airflow.

In each of the example configurations, the fan 260 can provide a desired air flow rate, e.g., inlet: min 26.5 cfm, outlets: 13.25 cfm each. Further, there is almost no air flow restriction towards the second row and air flow rate can be controlled depending on mode of operation, e.g., heating @ 5-10 cfm, cooling @ 10—max cfm. In one example, the heating mode requires using a positive temperature coefficient (PTC) heating element or similar technology to warm air up. These configurations extend comfort based on air flow form the first row to second and/or third row occupants, and reduces HVAC load for the entire vehicle thereby protecting electrified vehicle range.

FIGS. 10A-10B show an example of holistic climate logic 200. The system determines the current climate conditions and utilizes human-machine-interface (HMI)/controllers as indicated at 268 to control the HVAC as indicated at 270, and to control seat microenvironments/microclimates as indicated at 272, and for occupant peripheral control as indicated at 273. The HVAC control 270 includes one or more of the following: front defrost 274; rear defrost 276; defrost and foot mode 278; face mode 280; face and foot mode 282; and/or foot mode 284. The seat microclimate control 272 includes one or more of the following: neck scarf 286; cushion heat 288; back heat 290; and/or vent 292. The system then provides a holistic climate that balances the thermal need between seats and the HVAC as indicated at 294. This balance occurs due to the one or more controllers 18 controlling thermal elements of the HVAC and thermal elements of the seats based on a plurality of inputs as described above to achieve desired/target comfort levels. The holistic balance 294 is provided for each seat via various adjustments through the defrost and foot mode 278, face mode 280, face and foot mode 282, and/or foot mode 284 provided by the HVAC control 270, as well as via the neck scarf 286, cushion heat 288, back heat 290, and/or vent 292 provided by the seat microclimate control 272.

FIG. 10B shows one example of the holistic climate logic 200 for the HVAC 16 and the seat microenvironments 272. Fresh air enters the system at 300 and is filtered 302, circulated 304 for heating/cooling/venting purposes as indicated at 306. Temperature/humidity is determined for the overall HVAC system as indicated at 308. This is provided as input to the one or more controllers 18 that include software configured to compute characteristics such as sensation and comfort, for example, and to control temperature, humidity, and heat flux for both the heating/cooling/venting of the HVAC as indicated at 310 and the heating/cooling/venting for a seated occupant as indicated at 312. The seat microenvironments 272 are divided into a plurality of zones (Zone 1, Zone 2, Zone 3, Zone 4, etc.). In the example shown, Zone 1 is identified as having a seat occupant 314 seated on a seat 20. The heating/cooling/venting 316 for the occupant 314 on the seat 20 is controlled via the one or more controllers 18 as indicated at 312. Temperature/humidity/heat flux is determined for each zone as indicated at 318. The temperature/humidity/heat flux 318 is communicated back to the one or more controllers 18 as indicated at 320. The control of each of the other zones (Zone 2, Zone 3, Zone 4) is accomplished in a manner similar to that of Zone 1. The zones receive heating/cooling/venting 306 from the HVAC 16 as indicated at 322. In one example, heating/cooling/venting 306 is not supplied to unoccupied zones. Air from the microenvironments associated with each zone, is fluidly communicated back to the HVAC 16 for circulation 304 as indicated at 324. The various loops are automatically and continuously monitored/operated to maintain all desired target comfort levels.

In one example, a system and method is used to determine the current temperature of both the cabin 14 and an identified seat 20 and to determine which or both of the HVAC control or seat control to run to achieve the target comfort level as quickly as possible. The HVAC system, which is comprised of heating components, cooling components, thermal ducts, thermal vents, etc., as known, is used to provide heating or cooling of a volumetric space that is enclosed within a passenger cabin area. Each of the seats 20 includes one or more thermal elements 330 as schematically shown in FIG. 1. The thermal elements 330 can comprise or more heating elements and one or more cooling elements, for example, such that the thermal elements 330 can control a temperature of an associated seat 20. The one or more controllers 18 receive a thermal comfort setting for each of the seats and a current temperature of the volumetric space as measured by one or more sensors as described above. The one or more controllers 18 determine, based on received thermal comfort settings and the current temperature of the volumetric space, a temperature setting for the HVAC and a temperature setting for each occupied seat. The temperature setting for the HVAC and the temperature setting for each seat achieves the thermal comfort setting associated with each of the seats.

In one example, the one or more controllers 18 achieve the thermal comfort setting for each of the one or more seats by simultaneously controlling the HVAC 16 and one or more thermal elements 330 for each occupied seat 20.

In one example, the target thermal comfort setting/level is achieved via shortest time between a time for the HVAC 16 to achieve the target comfort level and a time for the thermal elements 330 to achieve target comfort level. In one example, the one or more controllers 18: determine a first amount of time required to reach the thermal comfort setting for each of the seats via the HVAC; determine a second amount of time required to reach the thermal comfort setting for each of the seats via one or more thermal elements for each occupied seat; and achieve the thermal comfort setting for each of the seats by controlling whichever of the HVAC and the one or more thermal elements for each occupied seat has a shortest time between the first time and the second time.

In one example, the target thermal comfort setting/level is achieved via a shortest time amongst a time for the HVAC 16 to achieve the thermal comfort level, a time for thermal elements 330 to achieve the thermal comfort level, and a combined time of the HVAC and thermal elements working together. In one example, the one or more controllers 18: determine a first amount of time required to reach the thermal comfort setting for each of the one or more seats via the HVAC; determine a second amount of time required to reach the thermal comfort setting for each of the one or more seats via the one or more thermal elements for each occupied seat; determine a third amount of time required to reach the thermal comfort setting for each of the seats via a combination of the HVAC and the one or more thermal elements for each occupied seat; and achieve the thermal comfort setting for each of the seats by controlling one or both of the HVAC and the one or more thermal elements for each occupied seat based on a shortest time of the first amount time, the second amount time, and the third amount time.

In one example, the target thermal comfort setting/level is achieved via a shortest time between a time for the HVAC 16 to achieve a desired thermal comfort setting/level and a time for the thermal elements 330 to achieve the thermal comfort setting/level. In one example, the one or more controllers 18: determine a temperature setting for the HVAC corresponding to the thermal comfort setting for each of the one or more seats in a first shortest amount of time; determine a temperature setting for the one or more thermal elements corresponding to the thermal comfort setting for each of the one or more seats in a second shortest amount of time; and achieve the thermal comfort setting for each of the one or more seats based on a shortest amount of time of the first shortest amount time and the second shortest amount time.

In one example, the target thermal comfort setting/level is achieved via a shortest amount of time amongst a time for the HVAC 16 to achieve the target comfort level, a time for the thermal elements 330 to achieve the target comfort level, and a combined time of the HVAC and thermal elements working together. In one example, the one or more controllers 18: determine a temperature setting for the HVAC corresponding to the thermal comfort setting for each of the one or more seats in a first shortest amount of time; determine a temperature setting for the one or more thermal elements corresponding to the thermal comfort setting for each of the one or more seats in a second shortest amount of time; determine a combination temperature setting for both the HVAC and the one or more thermal elements corresponding to the thermal comfort setting for each of the one or more seats in a third shortest amount of time; and achieve the thermal comfort setting for each of the one or more seats based on a shortest time of the first shortest amount time, the second shortest amount time, and the third shortest amount time.

In one example, the system determines times for each of the HVAC 16 and thermal elements 330 to achieve the desired thermal comfort level and applies the HVAC and seat temperature settings one after the other, e.g. consecutively. In one example, the one or more controllers 18: determine a first time corresponding to a first temperature setting for the HVAC accomplishing the thermal comfort setting for each of the one or more seats; determine a second time corresponding to a second temperature setting for the one or more thermal elements accomplishing the thermal comfort setting for each of the one or more seats; apply one of the first temperature setting and the second temperature setting for an associated one of the first time and the second time; and apply the other of the first temperature setting and the second temperature setting for the other of the associated first time and the second time after the associated one of the first time and the second time has expired. Thus, in this example, the system is consecutively using the HVAC and thermal elements to reach the desired thermal comfort levels.

In one example, the system seeks to minimize energy expenditure. In one example, the one or more controllers 18: determine a combined energy expenditure of the HVAC and the thermal elements 330 for each of the one or more seats 20; and achieve the thermal comfort setting by minimizing energy expenditure between the HVAC and thermal elements for the one or more seats. Thus, the system is splitting the amount of energy to minimize effect on the HVAC and thermal elements.

In one example, the system selects between maximizing range or comfort. In one example, the one or more controllers 18: determine a current driving mode, e.g., using one or more sensors to determine a status of the vehicle (on, off, drive, park, charging, etc.); and select between maximizing range or maximizing comfort. For maximizing range, the speed of achieving the thermal comfort setting can be reduced, for example. In one example, the one or more controllers 18 can also determine modes of charging of occupied vs. non-occupied status, and in connection with these vehicle modes determine a best use of available energy. For example, identification of charging occupied/non-occupied modes can be used to determine thermal load, energy use, and best preparation for how to use charging vehicle states for setting the vehicle for continued trip climatization.

In one example, a method is used to determine the current temperature of both the cabin area 14 and the seat 20, and to determine which or both to run to achieve the comfort setting as quickly as possible. In one example, the method comprises: providing an HVAC 16 to heat or cool a volumetric space 14; identifying one or more seats 20 within the volumetric space, each of the one or more seats comprising one or more thermal elements 330, the one or more thermal elements controlling a temperature of the one or more seats; determining a thermal comfort setting for each of the one or more seats; determining a current temperature of the volumetric space as measured by one or more sensors; and determining, based on the thermal comfort settings, the current temperature of the volumetric space, a temperature setting for the HVAC and a temperature setting for the one or more seats, the temperature setting for the HVAC and the temperature setting for the one or more seats achieving the thermal comfort setting for each of the one or more seats.

The method may include one or more of the following steps in any combination. In one example, the method includes achieving the thermal comfort setting for each of the one or more seats by simultaneously controlling the HVAC 16 and the one or more thermal elements 330 for each occupied seat.

In one example, the method includes: determining a first amount of time required to reach the thermal comfort setting for each of the one or more seats 20 via the HVAC 16; determining a second amount of time required to reach the thermal comfort setting for each of the one or more seats via the one or more thermal elements 330 for each occupied seat; and achieving the thermal comfort setting for each of the one or more seats by controlling whichever of the HVAC and the one or more thermal elements for each occupied seat has a shortest time between the first amount of time and the second amount of time.

In one example, the method includes: determining a first amount of time required to reach the thermal comfort setting for each of the one or more seats 20 via the HVAC 16; determining a second amount of time required to reach the thermal comfort setting for each of the one or more seats 20 via the one or more thermal elements 330 for each occupied seat; determining a third amount of time required to reach the thermal comfort setting for each of the one or more seats via a combination of the HVAC and the one or more thermal elements for each occupied seat; and achieving the thermal comfort setting for each of the one or more seats by controlling one or both of the HVAC and the one or more thermal elements for each occupied seat based on a shortest time of the first amount of time, the second amount of time, and the third amount of time.

In one example, the method includes: determining a temperature setting for the HVAC 16 corresponding to the thermal comfort setting for each of the one or more seats 20 in a first shortest amount time; determining a temperature setting for the one or more thermal elements 330 corresponding to the thermal comfort setting for each of the one or more seats in a second shortest amount of time; and achieving the thermal comfort setting for each of the one or more seats based on a shortest time of the first shortest amount time and the second shortest amount time.

In one example, the method includes: determining a temperature setting for the HVAC 16 corresponding to the thermal comfort setting for each of the one or more seats 20 in a first shortest amount time; determining a temperature setting for the one or more thermal elements 330 corresponding to the thermal comfort setting for each of the one or more seats 20 in a second shortest amount of time; determining a combination temperature setting for both the HVAC and the one or more thermal elements corresponding to the thermal comfort setting for each of the one or more seats in a third shortest amount of time; and achieving the thermal comfort setting for each of the one or more seats based on a shortest time of the first shortest amount time, the second shortest amount time, and the third shortest amount time.

In one example, the method includes: determining a first time corresponding to a first temperature setting for the HVAC 16 accomplishing the thermal comfort setting for each of the one or more seats 20; determining a second time corresponding to a second temperature setting for the one or more thermal elements 330 accomplishing the thermal comfort setting for each of the one or more seats 20; applying one of the first temperature setting and the second temperature setting for an associated one of the first time and the second time; and applying the other of the first temperature setting and the second temperature setting for the other of the associated first time and the second time after the associated one of the first time and the second time has expired. Thus, this consecutively uses the HVAC and thermal elements to reach the desired thermal comfort level.

In one example, the method includes: determining a combined energy expenditure of HVAC 16 and the thermal elements 330 for each of the one or more seats; and minimizing energy expenditure between the HVAC and thermal elements for the one or more seats to achieve the thermal comfort setting. Thus, this comprises splitting the amount of energy to minimize effect on the HVAC and thermal elements.

In one example, the method includes: determining a current driving mode; and selecting between maximizing range or maximizing comfort. For example, for maximizing range, the method would include reducing the speed of the thermal comfort setting achievement.

In one example, the method includes: inputting a number of planned occupants; inputting a destination range requirement; and determining a travel readiness of a vehicle based on the number of planned occupants and the destination range requirement. In one example, the method includes using sensors to detect a number of occupants or using a smart device or other input device to input number of planned occupants. In one example, the method includes using a smart device or other input device to communicate a desired destination. In one example, determining a travel readiness is as described above and can include determining pre-travel or active travel status, vehicle climate, pre-conditioning, etc.

In one example, the method, achieves travel readiness based on active and non-active conditions. In one example, the method includes: determining when vehicle "on" is required for travel readiness (e.g. vehicle is in an active/started condition), in accordance with a determination that vehicle "on" is required, starting the vehicle and activating the HVAC 16 and the thermal elements 330 for the one or more seats based on the thermal comfort setting for each of the one or more seats; and determining when vehicle "off" is available for travel readiness (e.g. vehicle is in a non-active/key-off condition), in accordance with a determination that vehicle "off" is available, activating the thermal elements 330 for the one or more seats 20, measuring cabin temperature, adjusting the thermal elements for the one or more seats until the thermal comfort setting for each of the one or more seats is reached, and notifying a driver that the vehicle is ready. In one example, the method includes generating an output signal from a vehicle communication source, smart device connected with the vehicle, etc., to notify the driver.

In another example, the system provides a holistic climate that balances thermal needs between one or more seats 20 and HVAC 16 for a passenger cabin 12 while maintaining thermal/energy needs for powertrain components P1-$n$. In one example, the system includes: at least one powertrain component (e.g. engine, battery, motor, On Board Charger (OBC), power electronics, etc.); at least one seat 20 positioned within an internal vehicle climate 14; a sensor sub-system including at least one vehicle climate sensor, at least one vehicle occupant sensor, at least one seat climate sensor, and at least one powertrain sensor. In one example, the sensor subsystem measures: one or more seat comfort characteristics (e.g., temperature, humidity, air flow, heat flux) associated with the at least one seat, and one or more cabin comfort characteristics (e.g., temperature, humidity, air flow, heat flux) associated with the internal vehicle climate. In one example, one or more controllers 18: determine a thermal status of the at least one powertrain component via the at least one powertrain sensor: determine a thermal status of the internal vehicle climate via the at least one vehicle climate sensor; determine a seat location for each detected occupant in the internal vehicle climate via the at least one vehicle occupant sensor; and independently adjust at least one of the seat comfort characteristic and the cabin comfort characteristic, the adjusting providing a desired microenvironment for each seat occupant while maintaining a desired thermal status for the at least one powertrain component. Maintaining the desired thermal status for the powertrain component can include, for example, providing sufficient heating/cooling capability for any specified powertrain components. In one example, the sensor-subsystem comprises a plurality of sensors such as that described above, and which can include temperature sensors, cameras, seat weight sensors, radar, lidar, sonar, etc. In one example, the thermal status is determined one or more sensors as described above and can include using temperature sensors, pressure sensors, flow sensors, etc. Independently adjusting one of the seat comfort characteristic and the cabin comfort characteristic can include, for example, changing flow rate, increasing/decreasing temperature, etc. In one example, the desired microenvironment for each seat occupant comprises a discrete immediate area surrounding each seated occupant.

In one example, the system balances energy required for powertrain components P1-$n$ with energy required for a desired microenvironment for each seat occupant. In one example, the system includes a plurality of powertrain components P1-$n$ for a vehicle 10, and the one or more controllers 18: determine a total vehicle index based on travel readiness and a number of detected occupants; determining an amount of energy required for the plurality of powertrain components achieving a desired operating condition; determining an amount of energy required to condition the internal vehicle climate; and controlling a balance between the amount of energy required for the plurality of powertrain components and the microenvironment for each seat occupant. In one example, balancing occurs by continuously monitoring/determining vehicle cabin temperature, occupant temperature, and energy required to achieve the desired operating condition; determining current capability of HVAC thermal output and seat thermal element output, and adjusting the outputs to maintain the desired microenvironment while also maintaining a sufficient amount of energy to achieve the desired operating condition. In one example, the total vehicle index is determined as described above, and comprises a determination of non-active versus active status, and a combination of vehicle travel readiness, overall vehicle climate, and occupancy. In one example, travel readiness is determined as described above and can include a determination of pre-travel or active travel status, vehicle climate, pre-conditioning, etc. In one example, the number of detected occupants is determined as described above and can include using sensors to detect a number of occupants or using a smart device or other input device to input number of planned occupants.

In one example, the system determines vehicle travel readiness based overall vehicle climate, range requirements, and occupancy to differentiate between thermal required for the powertrain versus energy required to condition the cabin. In one example, the system includes a plurality of sensors comprising one or more of a GPS sensor, a seat sensor, a vehicle camera, a buckle sensor, a pressure senor, and a steering wheel sensor. In one example, the one or more controllers: determine a number of occupants using one or more of the plurality of sensors; determining a range requirement to reach a specified destination; determine a travel readiness of a vehicle based on the number of occupants, the range requirement, and the thermal status of the internal vehicle climate; determine an amount of energy required by plurality of powertrain components and an amount of energy required to condition the internal vehicle climate; and notify a driver of a current vehicle state based on the travel readiness in relation to the amount of energy required by plurality of powertrain components and the amount of energy required to condition the internal vehicle climate.

In one example, the system uses a plurality of sensors as described above to sense internal and external vehicle conditions to determine an overall vehicle climate for travel readiness. In one example, the system includes one or more of a humidity sensor sensing humidity in the internal vehicle climate, a temperature sensor sensing a cabin temperature in the internal vehicle climate, a door/window sensor sensing an open/close status of each window and each door, and an external sensor sensing current weather conditions. In one example, the one or more controllers 18 further determine travel readiness by determining a vehicle climate index based on internal and external conditions as sensed by one or more of the plurality of sensors. The vehicle climate index is determined as described above and can include using GPS plus external and internal sensors to determine overall vehicle climate.

In one example, the system determine a total vehicle index based on overall vehicle climate, travel readiness, and occupancy. In one example: the plurality of powertrain components P1-$n$ comprises one or more of an engine, an on board charger, a battery, an electric motor, and power electronics; the seat comfort characteristic comprises one or more of a seat temperature, humidity, air flow, heat flux; and the cabin comfort characteristic comprises one or more of a cabin temperature, humidity, air flow, heat flux. In one example, the one or more controllers: determine a total vehicle index based on the vehicle climate index, travel readiness, and number of detected occupants; and achieve each desired microenvironment by selectively adjusting one or more seat comfort characteristics and cabin comfort characteristics by way of balancing an output from at least one of an HVAC and one or more thermal elements associated with a respective occupied seat. In one example, the balancing occurs by continuously monitoring vehicle cabin temperature and occupant temperature, determining current capability of HVAC thermal output and seat thermal element output, and adjusting the outputs to achieve each desired microenvironment as quickly as possible.

In one example, the system determines a desired microenvironment for each seat occupant using direct occupant input and occupant measured characteristics. In one example, the desired microenvironment for each seat occupant is determined by using one or more of the following: receiving input indicative of a desired thermal comfort setting associated with each occupied seat; a measured vital signal of an associated seat occupant; a predetermined occupant profile input to an specified seat; and a preset level based on a GPS location of a vehicle, received weather predictions for the GPS location, a time of day, or a time or year. In one example, the preset level can comprise, for example, factory presets entered as a baseline level for each seat. In one example, the desired thermal comfort setting associated with each occupied seat can comprise a direct occupant input via seat control elements such as switches, buttons, etc. In one example, the measured vital signal of an associated seat occupant can include using one or more sensors or a smart device to measure vital signs such as body temperature, heart rate, breathing characteristics, etc. In one example, the predetermined occupant profile input to an specified seat can be based on a user profile as described above or can comprise a list of preferences pre-loaded into the system.

In one example, the system balances control of HVAC and thermal elements to maintain microenvironments in multiple rows of seats and provides simultaneous control of HVAC and thermal elements to maintain microenvironments. In one example, the vehicle includes: at least a first row of seats 22*a* and a second row of seats 22*b*; an HVAC 16 controlling thermal conditions of the internal vehicle climate; and one or more thermal elements 330 associated with each seat 20. In one example, the one or more controllers 18: direct fluid flow along a thermal path in one or more seats from one of the first row and the second row to maintain a desired microenvironment in the other of the first row and the second row, and maintain each desired microenvironment by simultaneously controlling the HVAC 16 and the one or more thermal elements 330 associated with a respective occupied seat. In one example, fluid flow is directed along a thermal path by way of conduit or duct formed within one or more seat structures.

In one example, a method comprises balancing thermal needs between one or more seats and HVAC for a passenger cabin while maintaining thermal needs for powertrain. In one example, the method comprises: determining a thermal status of at least one vehicle component; determining a thermal status of an internal vehicle climate; determining a seat location for each detected occupant experiencing the internal vehicle climate; and independently adjusting at least one of a seat comfort characteristic and a cabin comfort characteristic, the adjusting providing a desired microenvironment for each seat occupant while maintaining a desired thermal status for the at least one vehicle component.

The method can include any of the following either alone or in any combination. In one example, the at least one component comprises a plurality of powertrain components P1-*n* for a vehicle 10, and the method includes: determining a total vehicle index based on travel readiness and a number of detected occupants; determining an amount of energy required for the plurality of powertrain components achieving a desired operating condition; determining an amount of energy required to condition the internal vehicle climate; and controlling a balance between the amount of energy required for the plurality of powertrain components and the microenvironment for each seat occupant by selectively adjusting at least one of the seat comfort characteristic and the cabin comfort characteristic. In one example, the balancing occurs by: continuously monitoring/determining vehicle cabin temperature, occupant temperature, and energy required to achieve the desired operating condition; determining current capability of HVAC thermal output and seat thermal element output; and adjusting the outputs to maintain the desired microenvironment while also maintaining a sufficient amount of energy to achieve the desired operating condition.

In one example, the method includes: determining a number of occupants; determining a range requirement to reach a specified destination; and determining a travel readiness of a vehicle based on the number of occupants, the range requirement, and the thermal status of the internal vehicle climate.

In one example, determining the number of occupants further includes one or more of the following: detecting GPS location of a connected smart device; using a seat sensor; using a vehicle camera; using a buckle sensor; using a pressure senor; and using a steering wheel sensor.

In one example, the method includes: determining travel readiness by determining a vehicle climate index based on internal and external climate conditions.

In one example, determining the vehicle climate index includes one or more of the following: sensing humidity in the internal vehicle climate; sensing a cabin temperature in the internal vehicle climate; determining an open/closed status of each window and each door; determining a sun load for the vehicle; determining a GPS location for the vehicle; and determining predicted weather conditions during travel to the specified destination.

In one example, the method includes differentiating between pre-travel and active travel for the destination range and the number of occupants, the method further including: determining when vehicle "on" is required for travel readiness, in accordance with a determination that vehicle "on" is required, starting the vehicle and activating the HVAC and the thermal elements for the one or more seats based on the thermal comfort setting for each of the one or more seats; and determining when vehicle "off" is available for travel readiness, in accordance with a determination that vehicle "off" is available, activating the thermal elements for the one or more seats, measuring a temperature of the internal vehicle climate, adjusting the thermal elements for the one or more seats until the thermal comfort setting for each of the one or more seats is reached, and notifying a driver that the vehicle is ready.

In one example, the method includes: determining a total vehicle index based on vehicle climate index, travel readiness, and number of detected occupants; and controlling a balance between the amount of energy required for the plurality of powertrain components and the microenvironment for each seat occupant by selectively adjusting at least one of the seat comfort characteristic and the cabin comfort characteristic. In one example, the balancing occurrs by: continuously monitoring/determining vehicle cabin temperature, occupant temperature, and energy required to achieve the desired operating condition; determining current capability of HVAC thermal output and seat thermal element output; and adjusting the outputs to maintain the desired microenvironment while also maintaining a sufficient amount of energy to achieve the desired operating condition.

In one example, the desired microenvironment for each seat occupant is determined by using one or more of the following: receiving input indicative of a desired thermal comfort setting associated with each occupied seat; a measured vital signal of an associated seat occupant; a predetermined occupant profile input to a specified seat; and a preset level based on a GPS location of a vehicle, received weather predictions for the GPS location, a time of day, or a time or year.

In one example, the seat comfort characteristic comprises one or more of a seat temperature, humidity, air flow, heat flux; and the cabin comfort characteristic comprises one or more of a cabin temperature, humidity, air flow, heat flux; and wherein the method includes: determining the desired microenvironment for each detected seat occupant; and achieving each desired microenvironment by selectively adjusting one or more seat comfort characteristics and cabin comfort characteristics by way of balancing an output from at least one of an HVAC 16 and one or more thermal elements 330 associated with a respective occupied seat. In one example, the balancing occurs by: continuously monitoring vehicle cabin temperature and occupant temperature; determining current capability of HVAC thermal output and seat thermal element output; and adjusting the outputs to achieve the desired microenvironment as quickly as possible.

In one example, the method includes: maintaining each desired microenvironment by simultaneously controlling the HVAC 16 and the one or more thermal elements 330 associated with a respective occupied seat 20.

In one example, the method includes: determining a number of rows in the vehicle; detecting a number of occupants in each row; and balancing the output from the HVAC 16 and the one or more thermal elements 330 associated with each occupied seat for each desired microenvironment in all rows. In one example, the balancing occurs by continuously monitoring vehicle cabin temperature and occupant temperature, determining current capability of HVAC thermal output and seat thermal element output, and adjusting the outputs to achieve each desired microenvironment as quickly as possible.

In one example, the number of rows in the vehicle includes at least a first row 22a and a second row 22b, the method further includes: directing fluid flow along a thermal path from one of the first row and the second row to maintain a desired microenvironment in the other of the first row and the second row.

In one example, the system provides a holistic climate that balances thermal need between different rows of seats 20 and HVAC 16 for a passenger cabin 12. In one example, the system includes: a first row of seats (e.g., at least two passenger seats placed side-by-side across a lateral width of a vehicle) in an internal vehicle climate; a second row of seats located behind the first row of seats (e.g., located aft of the first row of seats in a direction along a longitudinal length of a vehicle); a sensor subsystem including one or more vehicle climate sensors measuring a temperature of the internal vehicle climate and at least one seat climate sensor for each seat measuring a seat temperature for each occupied seat; and a thermal path having one end in flow communication with one of the first row of seats and the second row of seats and a second end in flow communication with a microenvironment for a seat in the other of the first row of seats and the second row of seats, wherein fluid flows through the thermal path to adjust at least one of the temperature of the internal vehicle climate and the seat temperature for each occupied seat. In one example, the thermal path comprises a directional flow path/channel via tubing, conduits, discrete flow openings, etc. that is located in a seat or a structure located adjacent to the seat.

In one example, the system provides thermal paths 266 formed within seats. In one example, the thermal path comprises one or more ducts or conduits 266 formed within a vehicle seat, console, or armrest. In one example, the thermal path comprises a directional flow path provided via defined channel passages.

In one example, the system includes at least one fan 260 that is associated with each duct or conduit 266. In one example, the fan comprises plurality of blades supported within a housing where flow through the blades can be bi-directional. In one example, the system uses an HVAC 16 and/or thermal elements 330 associated with seats to achieve desired microenvironments. In one example the system includes: an HVAC that heats and cools a volumetric space; one or more thermal elements associated with each seat in the first row of seats and the second row of seats; and one or more controllers 18. In one example, the one or more controllers 18: determine a desired microenvironment for each detected seat occupant, and achieve each desired microenvironment by balancing an output from at least one of the HVAC and the thermal elements associated with each occupied seat. In one example, the balancing occurs by: continuously monitoring vehicle cabin temperature and occupant temperature; determining current capability of HVAC thermal output and seat thermal element output; and adjusting the outputs to achieve the desired microenvironment as quickly as possible.

In one example, the system controls the microenvironment in one of the first and second row with cooling/heating flow from the other of the first row and second row. In one example, each seat 20 includes at least one thermal path 266 and the one or more controllers 18: maintain a desired microenvironment for occupied seats in the second row of seats by directing fluid flow along the thermal path in one or more seats from the first row of seats to the second row of seats, or maintain a desired microenvironment for occupied seats in the first row of seats by directing fluid flow along the thermal path in one or more seats from the second row of seats to the first row of seats. In one example, the system uses a plurality of row sensors to balance outputs from the HVAC and the thermal elements. In one example, the a sensor subsystem further includes: a plurality of first row temperature sensors that include one or more in-seat temperature sensors (e.g., at least one temperature sensor for each seat and optionally one or more additional temperature sensors external to the seats to determine a first row temperature); and a plurality of second row temperature sensors that include one or more in-seat temperature sensors (e.g., at least one temperature sensor for each seat and optionally one or more additional temperature sensors external to the seats to determine a second row temperature). In one example, the one or more controllers balancing an output, such as an output from HVAC output vents 30 for example, from at least one of the HVAC and the one or more thermal elements associated with a respective occupied seat in the microenvironment for each occupied seat based on temperature sensor data from the first row temperature sensors and the second row temperature sensors. In one example, the balancing occurs by continuously monitoring vehicle cabin temperature and occupant temperature, determining current capability of HVAC thermal output and seat thermal element output, and adjusting the outputs to achieve the desired microenvironment as quickly as possible.

In one example, the system identifies HVAC output areas and provides active control of vent output direction. In one example, the HVAC comprises a plurality of HVAC areas including one or more of a steering wheel area, lower leg area, door armrest area, and a central console area. In one example, the or more controllers 18: actively controlling vent output direction for one or more of the areas for each microenvironment. In one example, controlling vent output direction includes controlling movement and orientation of a plurality of vent slats.

In one example, the system uses thermal outputs from a back side of a front seat for an occupant in the second row. In one example, the system includes one or more seat vent outputs for one or more thermal paths in each seat in the first row of seats; and the or more controllers direct at least one seat vent output from a rear side of a front seat toward an upper body area (e.g., an area above an occupant's waist) associated with an occupied seat in the second row of seats, and independently controls each seat vent output based on the microenvironment specified for each occupied seat.

In another example, a method uses row differentiation to provide different strategies for balancing microenvironments between one or more rows 22*a*-*c* of seats. In one example, the method comprises: locating a first row of seats in an internal vehicle climate; locating a second row of seats behind the first row of seats; and directing fluid flow along a thermal path from one of the first row of seats and the second row of seats into a microenvironment for a seat in the other of the first row of seats and the second row of seats.

The method can include any of the following either alone or in any combination. In one example, the thermal path comprises one or more ducts or conduits 266 formed within a vehicle seat, console, or armrest.

In one example, the method includes: associating at least one fan 260 with each duct or conduit 266.

In one example, the method includes: determining a desired microenvironment for each detected seat occupant; and achieving each desired microenvironment by balancing an output from at least one of an HVAC 16 and one or more thermal elements 330 associated with a respective occupied seat. In one example, the balancing occurs by continuously monitoring vehicle cabin temperature and occupant temperature, determining current capability of HVAC thermal output and seat thermal element output, and adjusting the outputs to achieve the desired microenvironment as quickly as possible.

In one example, the desired microenvironment for each seat occupant is determined by using one or more of the following: receiving input indicative of a desired thermal comfort setting associated with each occupied seat; a measured vital signal of an associated seat occupant; a predetermined occupant profile input to an specified seat; and a preset level based on a GPS location of a vehicle, received weather predictions for the GPS location, a time of day, or a time or year.

In one example, the method includes: maintaining each desired microenvironment by simultaneously controlling the HVAC and the one or more thermal elements associated with a respective occupied seat.

In one example, the method includes: independently maintaining each desired microenvironment in all rows by balancing the output from the HVAC and the one or more thermal elements associated with each occupied seat. In one example, the balancing occurs by continuously monitoring vehicle cabin temperature and occupant temperature, determining current capability of HVAC thermal output and seat thermal element output, and adjusting the outputs to achieve the desired microenvironment as quickly as possible.

In one example, each seat includes at least one thermal path 266 the method further includes: maintaining a desired microenvironment for occupied seats in the second row by directing fluid flow along the thermal path in one or more seats from the first row to the second row; or maintaining a desired microenvironment for occupied seats in the first row by directing fluid flow along the thermal path in one or more seats from the second row to the first row.

In one example, the method includes: providing the first row of seats with a plurality of first row temperature sensors that include one or more in-seat temperature sensors; providing the second row of seats with a plurality of second row temperature sensors that include one or more in-seat temperature sensors; and balancing an output from at least one of an HVAC and one or more thermal elements associated with a respective occupied seat in the microenvironment for each occupied seat based on temperature sensor data from the first row temperature sensors and the second row temperature sensors. In one example, the balancing occurs by continuously monitoring vehicle cabin temperature and occupant temperature, determining current capability of HVAC thermal output and seat thermal element output, and adjusting the outputs to achieve the desired microenvironment as quickly as possible.

In one example, the method includes: providing HVAC output from a plurality of areas including one or more of a steering wheel area, lower leg area, door armrest area, central console area.

In one example, the method includes: actively controlling vent output direction (e.g., controlling movement and orientation of a plurality of vent slats) for one or more of the areas for each microenvironment.

In one example, the method includes: providing one or more seat vent outputs for one or more thermal paths in each seat in the first row of seats; and directing at least one seat vent output from a rear side of a front seat toward an upper body area associated with an occupied seat in the second row of seats.

In one example, the method includes: independently controlling each seat vent output based on the microenvironment specified for each occupied seat.

In another example, the system uses a predefined user profile to determine an optimum location of the occupant relative to seat/HVAC within the cabin. In one example, the system includes: a user profile for each seat occupant that includes a predetermined occupant comfort level; at least one seat located within an internal vehicle climate; one or more sensors measuring a temperature of the internal vehicle climate; and one or more controllers 18. In one example, in accordance with a determination of the predetermined occupant comfort level and a determination of a thermal status of the internal vehicle climate, the predetermined occupant comfort level is achieved by automatically adjusting at least one of: a seat position for each seat occupant relative to a HVAC thermal output to the internal vehicle climate, and a HVAC thermal flow output direction to the internal vehicle climate. In one example, the user profile is determined as described above, and can comprise, for example, a data file including a plurality of preferences such as height, weight, age, current vital signs, climate preferences, season/weather type, seat position for each seat occupant that includes a predetermined occupant comfort level. In one example, adjusting a seat position for each seat occupant can include fore/aft seat adjustment, up/down seat adjustment, and/or reclined/upright seat adjustment.

In one example, there are various factors for determining predetermined occupant comfort level. In one example, the predetermined occupant comfort level for each seat occupant is determined based on one or more of the following: receiving direct user input indicative of a desired thermal comfort setting associated with each occupied seat; a measured vital signal of an associated seat occupant; a predetermined occupant profile input to a specified seat that includes one or more of age, weight, height, climate preference; a preset level based on a GPS location of a vehicle; received weather predictions for the GPS location (e.g., weather forecast information received from smart device); a time of day; or a time or year.

In one example, the system uses HVAC 16 and thermal elements 330 for each seat to control temperature. In one example, the system includes: an HVAC to heat or cool a volumetric space of the internal vehicle, wherein the thermal output comprises one or more HVAC vents; and one or more thermal elements associated with each seat that control seat temperature.

In one example, the system achieves predetermined occupant comfort level by adjusting vent output direction. In one example, the one or more controllers 18: achieve the predetermined occupant comfort level by adjusting the thermal flow output direction for one or more of the HVAC vents, the adjustments targeting a specified occupant area.

In one example, the one or more controllers: automatically close the HVAC vents 30 that are associated with unoccupied seats.

In one example, the system achieves predetermined occupant comfort level by adjusting seat position. In one example, the one or more controllers: achieve the predetermined occupant comfort level by adjusting the seat position (e.g., controlling movement of the seat in one or more directions) relative to HVAC vents.

In one example, the system achieves the predetermined occupant comfort level by adjusting HVAC or thermal elements for each seat. In one example, the one or more controllers 18: determine a current temperature of the volumetric space as measured by the one or more sensors; determine a current temperature of an occupant in each occupied seat of the one or more seats as measured by the one or more sensors; and determine, based on the predetermined occupant comfort level, the current temperature of the volumetric space, and the current temperature of an occupant associated with the predetermined occupant comfort level tied to a detected occupied seat: a temperature setting for the HVAC; and a temperature setting for each detected occupied seat.

In one example, a method includes adjusting seat position/HVAC position based on a predefined user profile to an optimum location of the occupant relative to a HVAC output within the cabin. In one example the method comprises: creating a user profile for a seat occupant, the user profile comprising a predetermined occupant comfort level; determining a thermal status; and in accordance with a determination of the predetermined occupant comfort level and a determination of the thermal status of the internal vehicle climate, achieving the predetermined occupant comfort level by automatically adjusting at least one of the following: a seat position for each seat occupant relative to a HVAC thermal to the internal vehicle climate, and a HVAC thermal flow output direction to the internal vehicle climate corresponding to the predetermined occupant comfort level.

In one example, the user profile to determine the predetermined occupant comfort level for each seat occupant is determined by using one or more of the following: receiving direct user input indicative of a desired thermal comfort setting associated with each occupied seat; a measured vital signal of an associated seat occupant; a predetermined occupant profile input to an specified seat that includes one or more of age, weight, height, climate; a preset level based on a GPS location of a vehicle; received weather predictions for the GPS location; a time of day; or a time or year.

In one example, the method includes: providing an HVAC 16 to heat or cool a volumetric space, wherein the thermal output comprises one or more HVAC vents 30; and providing each seat with one or more thermal elements 330 controlling a temperature of each associated seat 20.

In one example, the method includes: achieving the predetermined occupant comfort level by adjusting the thermal flow output direction for one or more of the HVAC vents, the adjustments targeting a specified occupant area.

In one example, the method includes: automatically closing the HVAC vents that are associated with unoccupied seats.

In one example, the method includes: achieving the predetermined occupant comfort level by adjusting the seat position relative to HVAC vents.

In one example, the method includes: adjusting seat position in at least one of a fore/aft direction, up/down direction, rotational direction, and along a tilt/recline path.

In one example, the method includes: overriding adjustment of seat position or adjustment of thermal flow output direction associated with an occupied seat based on direct input from an associated with the occupied seat.

In one example, the method includes: determining a current temperature of the volumetric space as measured by one or more sensors; determining a current temperature of an occupant in each occupied seat of the one or more seats as measured by the one or more sensors; and determining, based on the predetermined occupant comfort level, the current temperature of the volumetric space, and the current temperature of an occupant associated with the predetermined occupant comfort level tied to a detected occupied seat: a temperature setting for the HVAC; and a temperature setting for each detected occupied seat.

In one example, the method includes: achieving a predetermined occupant comfort level for each of the one or more seats by simultaneously controlling the HVAC and the one or more thermal elements for each occupied seat.

In one example, the method includes: determining a first amount of time required to reach the predetermined occupant comfort level for each of the one or more seats via the HVAC; determining a second amount of time required to reach the predetermined occupant comfort level for each of the one or more seats via the one or more thermal elements for each occupied seat; and in accordance with a determination of the first amount of time and the second amount of time, achieving the predetermined occupant comfort level for each of the one or more seats by controlling whichever of the HVAC and the one or more thermal elements for each occupied seat has a shortest time between the first amount of time and the second amount of time.

In one example, the method includes: determining a combined energy expenditure of HVAC 16 and the thermal elements 330 for each of the one or more seats; and minimizing energy expenditure between the HVAC and one or more seats to achieve the thermal comfort setting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system, comprising:
one or more sensors, wherein the one or more sensors comprises a plurality of external sensors positioned outside a vehicle and a plurality of internal sensors positioned within the vehicle;
one or more controllers configured to:
receive a thermal comfort setting for each of one or more seats within a volumetric space of the vehicle, wherein the one or more seats comprises one or more thermal elements adapted to control a temperature of each of the one or more seats to provide the thermal comfort setting;
receive data from the one or more sensors;
determine, based on the received thermal comfort setting and the received data, a temperature setting for a heating, ventilation and air conditioning (HVAC) system, and a temperature setting for the one or more seats;
evaluate a vehicle climate index based on the data received from the one or more sensors;
determine an operating state of the vehicle including an "ON" state or an "OFF" state based on at least one of the vehicle climate index;
in response to determining the operating state is the "ON" state, activate the HVAC system to achieve an optimized thermal comfort setting based on the determined temperature setting for the HVAC system;
in response to determining the operating state is the "OFF" state, activate at least one of the one or more thermal elements while maintaining the vehicle in the "OFF" state based on the temperature setting for the one or more seats; and
control operation of the HVAC system and the one or more thermal elements based on the vehicle climate index and the vehicle operating state to optimize energy consumption by the HVAC system and the one or more thermal elements.

2. The system of claim 1, wherein the one or more controllers is further configured to control the optimized thermal comfort setting for each of the one or more seats based on the one or more controllers controlling the HVAC system and the one or more thermal elements for each occupied seat.

3. The system of claim 1, wherein the one or more controllers is further configured to:
determine a first amount of time required to reach the thermal comfort setting for each of the one or more seats via the HVAC system;

determine a second amount of time required to reach the thermal comfort setting for each of the one or more seats via the one or more thermal elements for each occupied seat; and
control at least one of the HVAC system and the one or more thermal elements to provide the thermal comfort setting for each of the one or more seats based on a shortest time between the first amount of time and the second amount of time.

4. The system of claim 1, wherein the one or more controllers is further configured to:
determine a first amount of time required to reach the thermal comfort setting for each of the one or more seats via the HVAC system;
determine a second amount of time required to reach the thermal comfort setting for each of the one or more seats via the one or more thermal elements for each occupied seat;
determine a third amount of time required to reach the thermal comfort setting for each of the one or more seats via a combination of the HVAC system and the one or more thermal elements for each occupied seat;
control at least one of the HVAC system and the one or more thermal elements for each of the one or more seats based on a shortest time between the first amount of time, the second amount of time, and the third amount time; and
control at least one of the HVAC system and the one or more thermal elements to provide the thermal comfort setting for each of the one or more seats based on a shortest time of the first amount time, the second amount time, and the third amount time.

5. The system of claim 1, wherein the one or more controllers is further configured to:
determine a temperature setting for the HVAC system corresponding to the thermal comfort setting for each of the one or more seats in a first shortest amount of time;
determine a temperature setting for the one or more thermal elements corresponding to the thermal comfort setting for each of the one or more seats in a second shortest amount of time; and
control the HVAC system and the one or more thermal elements to provide the thermal comfort setting for each of the one or more seats based on a shortest time of the first shortest amount of time and the second shortest amount of time.

6. The system of claim 1, wherein the one or more controllers us further configured to:
determine a temperature setting for the HVAC system corresponding to the thermal comfort setting for each of the one or more seats in a first shortest amount of time;
determine a temperature setting for the one or more thermal elements corresponding to the thermal comfort setting for each of the one or more seats in a second shortest amount of time;
determine a combination temperature setting for both the HVAC system and the one or more thermal elements corresponding to the thermal comfort setting for each of the one or more seats in a third shortest amount of time; and
control the HVAC system and the one or more thermal elements to provide the thermal comfort setting for each of the one or more seats based on a shortest time of the first shortest amount of time, the second shortest amount of time, and the third shortest amount of time.

7. The system of claim 1, wherein the one or more controllers is further configured to:

determine a first time corresponding to a first temperature setting for the HVAC system accomplishing the thermal comfort setting for each of the one or more seats;

determine a second time corresponding to a second temperature setting for the one or more thermal elements accomplishing the thermal comfort setting for each of the one or more seats;

control the HVAC system to operate based on one of the first temperature setting and the second temperature setting for an associated one of the first time and the second time; and control the one or more thermal elements to operate based on the other of the first temperature setting and the second temperature setting for the other of the associated first time and the second time after the associated one of the first time and the second time has expired.

8. The system of claim 1, wherein the one or more controllers is further configured to:

determine a combined energy expenditure of HVAC system and the one or more thermal elements for each of the one or more seats; and control the HVAC system and the one or more thermal elements to provide the thermal comfort setting by minimizing energy expenditure between the HVAC system and thermal elements for the one or more seats.

9. The system of claim 1, wherein the one or more controllers is further configured to:

determine a current driving mode to indicate a status of a vehicle, wherein the status of the vehicle comprises at least one of an on state, an off state, a drive state, a parked state, a charging state etc.;

select between one of maximizing range setting or maximizing comfort setting based on the determined current driving mode; and control distribution of an available energy for providing one of the maximum range setting or the maximum comfort setting based on the one of the determined current driving mode.

10. The system of claim 1, wherein the one or more controllers is further configured to:

determine the operating state of the vehicle including the "ON" state or the "OFF" state based on the vehicle climate index, a number of occupants, a destination distance, and an available vehicle range;

determine a combined energy expenditure for each of the HVAC system and the one or more thermal elements based on the determined temperature setting for the HVAC system and the determined temperature setting for the one or more seats, such that for achieving the optimized thermal comfort setting for each of the one or more seats;

determine a mode of a plurality of modes of the system based on one of an on state, an off state, a drive state, a parked state, or a charging state of the system; and optimize distribution of an available energy based on the combined energy expenditure for achieving one of maximum range setting or maximum comfort setting based on the one of the determined mode.

11. A method, comprising:

determining a thermal comfort setting for each of one or more seats within a volumetric space, wherein the one or more seats comprises one or more thermal elements adapted to control a temperature of each of the one or more seats to provide the thermal comfort setting;

receiving data from a determining a current temperature of the volumetric space as measured by one or more sensors; and determining, based on the thermal comfort setting and the received data, the current temperature of the volumetric space, a temperature setting for a heating, ventilation and air conditioning (HVAC) system, and a temperature setting for the one or more seats;

evaluating a vehicle climate index based on the data received from the one or more sensors;

determining an operating state of the vehicle including an "ON" state or an "OFF" state based on at least one of the vehicle climate index;

in response to determining the vehicle operating state is the "ON" state, activate the HVAC system to achieve an optimized thermal comfort setting based on the determined temperature setting for the HVAC system;

in response to determining the vehicle operating state is the "OFF" state, activate at least one of the one or more thermal elements while maintaining the vehicle in the "OFF" state based on the temperature setting for the HVAC system and the temperature setting for the one or more seats; and controlling operation of the HVAC system and the one or more thermal elements based on the vehicle climate index and the vehicle operating state to optimize energy consumption by the HVAC system and the one or more thermal elements.

12. The method of claim 11, further including achieving the optimized thermal comfort setting for each of the one or more seats based on the HVAC system and the one or more thermal elements for each occupied seat.

13. The method of claim 11, further including:

determining a first amount of time required to reach the thermal comfort setting for each of the one or more seats via the HVAC system;

determining a second amount of time required to reach the thermal comfort setting for each of the one or more seats via the one or more thermal elements for each occupied seat; and controlling each of the HVAC system and the one or more thermal elements to provide the thermal comfort setting for each of the one or more seats based on a shortest time between the first amount time and the second amount time.

14. The method of claim 11, further including:

determining a first amount of time required to reach the thermal comfort setting for each of the one or more seats via the HVAC system;

determining a second amount of time required to reach the thermal comfort setting for each of the one or more seats via the one or more thermal elements for each occupied seat;

determining a third amount of time required to reach the thermal comfort setting for each of the one or more seats via a combination of the HVAC system and the one or more thermal elements for each occupied seat; and controlling at least one of the HVAC system and the one or more thermal elements to provide the thermal comfort setting for each of the one or more seats based on a shortest time of the first amount time, the second amount time, and the third amount time.

15. The method of claim 11, further including:

determining a temperature setting for the HVAC system corresponding to the thermal comfort setting for each of the one or more seats in a first shortest amount of time;

determining a temperature setting for the one or more thermal elements corresponding to the thermal comfort setting for each of the one or more seats in a second shortest amount of time; and control the HVAC system and the one or more thermal elements to provide the thermal comfort setting for each of the one or more seats based on a shortest time of the first shortest amount of time and the second shortest amount of time.

16. The method of claim 11, further including:

determining a temperature setting for the HVAC system corresponding to the thermal comfort setting for each of the one or more seats in a first shortest amount of time;

determining a temperature setting for the one or more thermal elements corresponding to the thermal comfort setting for each of the one or more seats in a second shortest amount of time;

determining a combination temperature setting for both the HVAC system and the one or more thermal elements corresponding to the thermal comfort setting for each of the one or more seats in a third shortest amount of time; and controlling the HVAC system and the one or more thermal elements to provide the thermal comfort setting for each of the one or more seats based on a shortest time of the first shortest amount of time, the second shortest amount of time, and the third shortest amount of time.

17. The method of claim 11, further including:

determining a first time corresponding to a first temperature setting for the HVAC system accomplishing the thermal comfort setting for each of the one or more seats;

determining a second time corresponding to a second temperature setting for the one or more thermal elements accomplishing the thermal comfort setting for each of the one or more seats;

controlling the HVAC system to operate based on one of the first temperature setting and the second temperature setting for an associated one of the first time and the second time; and controlling the one ore more thermal elements to operate based on the other of the first temperature setting and the second temperature setting for the other of the associated first time and the second time after the associated one of the first time and the second time has expired.

18. The method of claim 11, further including:

determining a current driving mode for identifying a status of a vehicle, wherein the status of the vehicle comprises at least one of an on state, an off state, a drive state, a parked state, a charging state etc.;

selecting between one of maximizing range or maximizing comfort based on the determined current driving mode; and controlling distribution of a total energy for providing one of the maximum range setting or the maximum comfort setting based on the one of the determined current driving mode.

19. The method of claim 11, further including:

inputting a number of planned occupants;

inputting a destination range requirement; and determining a travel readiness of a vehicle based on the number of planned occupants and the destination range requirement.

20. The method of claim 19, further including:

in response to determining the "on" state is required for the travel readiness, starting the vehicle and activating the HVAC system and the one or more thermal elements for the one or more seats based on the thermal comfort setting for each of the one or more seats;

in response to determining the "off" state is available for the travel readiness, activating the thermal elements for the one or more seats, measuring a cabin temperature, adjusting the thermal elements for the one or more seats until the thermal comfort setting for each of the one or more seats is reached, and notifying a driver that the vehicle is ready;

determining vehicle charging status and on-route status, and in accordance with a determination that when vehicle is charging and on-route is valid, determining charging occupied status and thermal comfort need, or determining charging non-occupied status and thermal comfort need, and subsequently adjusting the thermal elements accordingly; and in accordance with a determination that when vehicle is charging and is not on-route is valid, determining charging occupied status and thermal comfort need, or determining charging non-occupied status and thermal comfort need, and subsequently adjusting the thermal elements accordingly.

* * * * *